(12) United States Patent
Kelly et al.

(10) Patent No.: US 12,002,276 B2
(45) Date of Patent: Jun. 4, 2024

(54) DOCUMENT DISTINGUISHING BASED ON PAGE SEQUENCE LEARNING

(71) Applicant: Bill.com, LLC, Palo Alto, CA (US)

(72) Inventors: Xin Geng Kelly, Los Altos Hills, CA (US); Sangammohan Harimohan Singh, San Ramon, CA (US); Derek Chan, San Jose, CA (US); Eitan Anzenberg, Emeryville, CA (US)

(73) Assignee: BILL Operations, LLC, San Jose, CA (US)

( * ) Notice: Subject to any disclaimer, the term of this patent is extended or adjusted under 35 U.S.C. 154(b) by 436 days.

(21) Appl. No.: 17/208,223

(22) Filed: Mar. 22, 2021

(65) Prior Publication Data
US 2022/0300735 A1    Sep. 22, 2022

(51) Int. Cl.
| | |
|---|---|
| *G06K 9/00* | (2022.01) |
| *G06F 16/93* | (2019.01) |
| *G06N 3/049* | (2023.01) |
| *G06N 20/00* | (2019.01) |
| *G06V 30/412* | (2022.01) |
| *G06V 30/416* | (2022.01) |
| *G06Q 30/04* | (2012.01) |

(52) U.S. Cl.
CPC ............ *G06V 30/416* (2022.01); *G06F 16/93* (2019.01); *G06N 3/049* (2013.01); *G06N 20/00* (2019.01); *G06V 30/412* (2022.01); *G06Q 30/04* (2013.01)

(58) Field of Classification Search
CPC ....................................................... G06F 16/93
See application file for complete search history.

(56) References Cited

U.S. PATENT DOCUMENTS

| | | | | |
|---|---|---|---|---|
| 8,244,795 B2* | 8/2012 | Ponte | ....................... | G06F 16/95 |
| | | | | 709/224 |
| 9,342,742 B2* | 5/2016 | Amtrup | .................... | G06T 7/143 |
| 2005/0134935 A1* | 6/2005 | Schmidtler | ............. | G06F 40/10 |
| | | | | 358/448 |
| 2011/0137898 A1* | 6/2011 | Gordo | ..................... | G06F 16/93 |
| | | | | 707/E17.089 |
| 2020/0073882 A1* | 3/2020 | Guggilla | .................. | G06N 5/02 |

OTHER PUBLICATIONS

Hani Daher, et al; "Document Flow Segmentation for Business Applications. Document Recognition and Retrieval XXI", Feb. 2014, 12 Pages; San Francisco, France.
Onur Agin, et al; "An Approach to the Segmentation of Multi-Page Document Flow Using Binary Classification"; Proceedings of SPIE, vol. 9443, 944311; Mar. 2015; 8 Pages; Kocaeli, Turkey.

(Continued)

*Primary Examiner* — Hadi Akhavannik
(74) *Attorney, Agent, or Firm* — Shook, Hardy & Bacon L.L.P.

(57) ABSTRACT

The accuracy of existing machine learning models, software technologies, and computers are improved by estimating whether a particular page belongs to a same document as another page or whether the page belongs to a different document. Such document distinguishing can be based on deriving relationship information between a first feature vector representing the page and a second feature vector representing the other page. This also improves the user experience and model building experience, among other things.

20 Claims, 12 Drawing Sheets

(56) References Cited

OTHER PUBLICATIONS

A Gordo, et al; "Document Classification and Page Stream Segmentation for Digital Mailroom Applications," 2013 12th International Conference on Document Analysis and Recognition, 2013, 5 Pages; Barcelona, Spain.
Gregor Wiedemann, et al; "Page Stream Segmentation with Convolutional Neural Nets Combining Textual and Visual Features"; Leipzig University; Mar. 25, 2019; 6 pages; Germany.
I. Gallo, et al; "Deep Neural Networks for Page Stream Segmentation and Classification," 2016 International Conference on Digital Image Computing: Techniques and Applications, 7 Pages; Varese, Italy.
Doermann, D., et al., "Ch 6: Analysis of the Logical Layout of Documents; Ch 7: Page Similarity and Classification; Ch 10: Machine-Printed Character Recognition", In: "Handbook of Document Image Processing and Recognition", Springer Reference, Retrieved from Internet URL : http://link.springer.com/content/pdf/10.1007/978-0-85729-859-1.pdf, p. 105 (2014).
Mironczuk, M. M., and Protasiewicz, J., "A recent overview of the state-of-the-art elements of text classification", Expert Systems With Applications, vol. 106, pp. 36-54 (2018).
International Search Report and Written Opinion received for PCT Patent Application No. PCT/US2022/020350, dated Jun. 22, 2022, 13 pages.
International Preliminary Report on Patentability received for PCT Application No. PCT/US2022/020350, dated Oct. 5, 2023, 10 pages.
Office Action received for Australian Patent Application No. 2022245920, mailed on Feb. 12, 2024, 3 pages.

\* cited by examiner

600

1 ⊢603A

Invoice

From
ABC Plumbing & Heating
bob@abcplumbing.com
123 Madison drive
Seattle, WA
7829Q
Phone: 990-120-4560

605A

For
John Doe
johndoe@gmail.com
87 Private ST
Seattle, WA
Phone: 990-302-1898

607A

611A

Number  INV02081
Date    Jun 14, 2018
Terms   5 Days
Due     Jun 19, 2018

609A

613A

| Description | Price | Qty | Amount |
|---|---|---|---|
| Installed new bathroom sink<br>Took me about 1 hour – I was able to use existing piping | $50.00 | 1 | $50.00 |
| Toto sink 19" Drop In<br>SN: 195 104 104 | $150.00 | 1 | $150.00 |
| Insinkerator Garbage Disposal<br>SN: 02329357<br>Three year warranty | $100.00 | 1 | $100.00 |
| Delta Kitchen Faucet<br>SN: 7651-AR-DST | $250.00 | 1 | $250.00 |
| Delta Bathroom Faucet<br>SN: 4586LF | $75.00 | 1 | $75.00 |

615A

Notes
Please pay within 20 days by Paypal (bob@abcplumbing.com)

Thank you for your business!

| 2 | ~603B

Invoice

611B

From
ABC Plumbing & Heating  ~605B
bob@abcplumbing.com
123 Madison drive
Seattle, WA
7829Q
Phone: 990-120-4560

For
John Doe
johndoe@gmail.com
87 Private ST
Seattle, WA
Phone: 990-302-1898

607B

Number  INV02081
Date    Jun 14, 2018
Terms   5 Days            ~609B
Due     Jun 19, 2018

613B

| Description | Price | Qty | Amount |
|---|---|---|---|
| Installed new kitchen sink<br>Took me about 3 hours to add in new piping and make adjustments to countertop | $50.00 | 3 | $150.00 |
| Toto sink 25l<br>SN: 123 109 109 | $500.00 | 1 | $500.00 |
| Nest smart thermostat<br>SN: 908 1232 055<br>Two year warranty | $250.00 | 1 | $250.00 |
| Worcester Greenstar 30i<br>SN: 890 123<br>Five year warranty | $1,500.00 | 1 | $1,500.00 |

615B

Subtotal      $3,025.00
GST (12%)       $363.00

Total         $3,388.00
Balance Due   $3,388.00

Notes
Please pay within 20 days by Paypal (bob@abcplumbing.com)   ~617B
Thank you for your business!

*FIG. 6B.*

DOCUMENT DISTINGUISHING BASED ON PAGE SEQUENCE LEARNING

BACKGROUND

In various computer applications, multiple documents (e.g., invoices, digital books, letters, etc.), each containing multiple pages, are uploaded, downloaded, or otherwise stored in computer memory. However, these documents are often stored without any indication of which page belongs to which document. Existing technologies, such as existing machine learning models, are inaccurate in determining which page belongs to which document to distinguish documents. These technologies also negatively affect the user experience and model building experience, among other things.

BRIEF SUMMARY

Particular embodiments of the present disclosure include a computer-implemented method, a non-transitory computer storage medium, and a system. Some aspects are directed to improving the accuracy of existing machine learning models, software technologies, and computers by estimating whether a particular page belongs to a same document as another page or whether the page belongs to a different document. Such document distinguishing can be based on deriving (e.g., via a machine learning model) relationship information between a first feature vector representing a first page and a second feature vector representing another page. This also improves the user experience and model building experience, among other things. Other advantages, embodiments, improvements and the like are described herein.

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

BRIEF DESCRIPTION OF THE SEVERAL VIEWS OF THE DRAWINGS

The present technology is described in detail below with reference to the attached drawing figures, wherein:

FIG. 6A illustrates specific characteristics that can be extracted from a page of an invoice document for document processing, according to some embodiments.

FIG. 6B illustrates a second page, which is a continuation page of the page of FIG. 6A, which shows how sequence learning can be performed based on similar characteristics, according to some embodiments.

DETAILED DESCRIPTION

Figure 1:
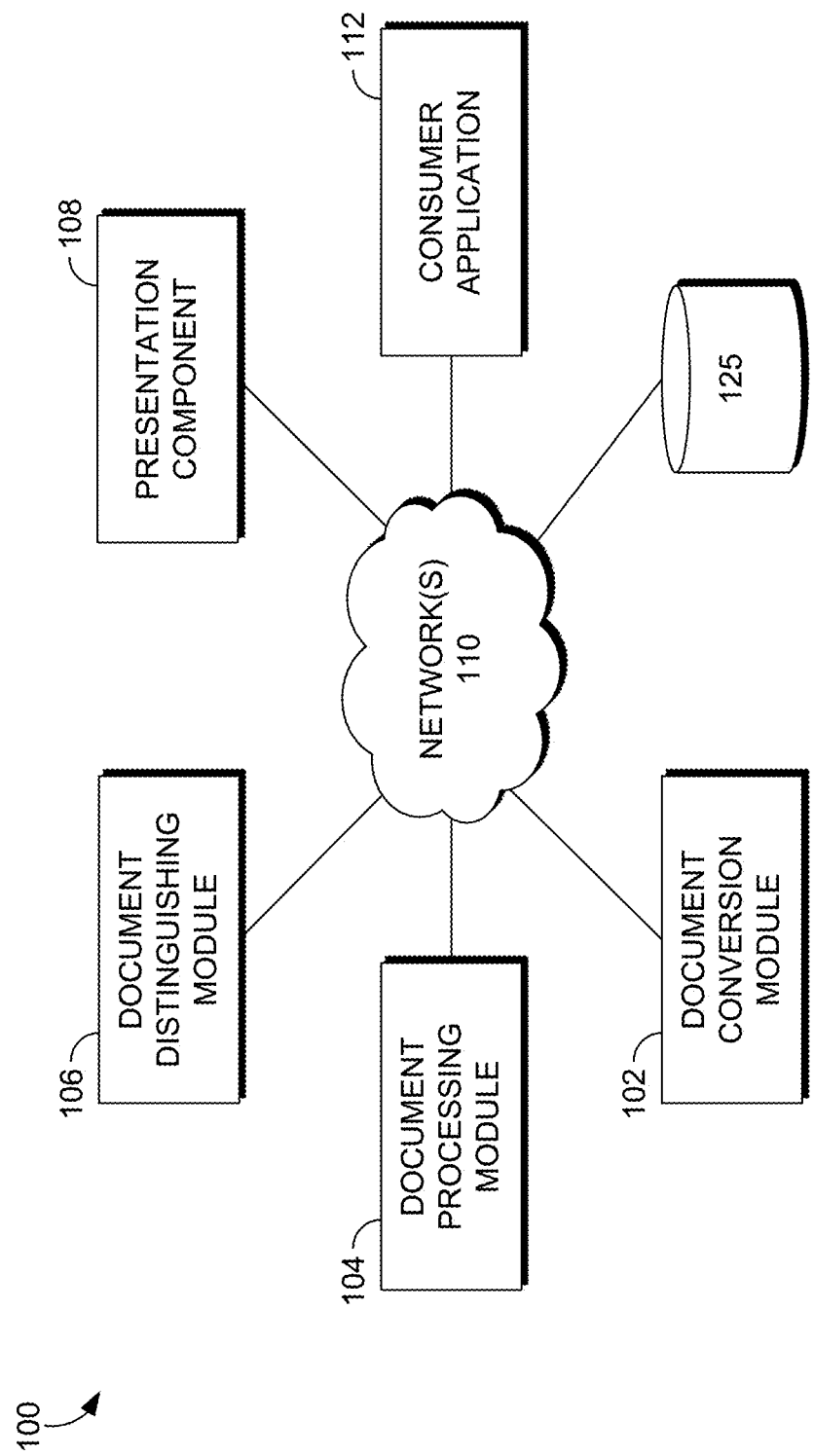
FIG. 1 is a block diagram of an illustrative system architecture, according to some embodiments.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different components of methods employed, the terms should not be interpreted as implying any particular order among or between various steps herein disclosed unless and except when the order of individual steps is explicitly described.

Existing computers themselves, machine learning models, software applications (e.g., object character recognition (OCR)), and other technologies that process documents are inaccurate in distinguishing whether certain pages belong to certain documents. For example, some technologies use an algorithm that models a couple of pages into a single feature vector representation using several extracted features from documents and a binary classifier to determine either segmentation or continuity. Other technologies involve a bag of visual words model and use transition feature vectors to predict the relationship between pages. In yet other technologies, the functionality is to combine all pages into a single feature vector to represent the whole document and used an optimized statistical model to represent the probability of each segmentation belonging to a particular class. Other existing machine learning methods (e.g., Deep Neural Networks (DNNs)) combine image and text features of the documents and then classify a stream of pages as belonging to different classes of documents.

All of these existing technologies predict whether a first page is of a certain class at a page level without regard to the precise relationship information or sequence context of pages that are before and/or after the first page. In other words, these technologies treat each page independently (or all together) for classification. However, often times features located in specific prior or future pages provide strong indicators whether a page being currently processed belongs to a particular document. For example, a document may include a natural language sentence that is a continuation of a sentence on an immediately ordered prior page. In another example, a page number sequence may be indicated on each page of a document. But because these technologies classify pages one page at a time with no specific forward or backward sequence context of other pages, they are more likely to be inaccurate in predictions.

Existing technologies also negatively affect the user experience or model building experience based on tedious manual user input. For example, because some existing technologies do not determine which pages belong to each documents, users are forced to arduously indicate which pages belong to which document, which is tedious and time consuming. Further, existing technologies require manual feature engineering. Feature engineering is the process of identifying and extracting features from raw data, often using domain-specific or subject matter expert (SME) expertise in order to create a machine learning model. For example, SMEs, such as doctors or scientists, often have to define the features to be extracted from documents and then the data is cleaned or otherwise manually pre-processed (e.g., via data munging, data wrangling, etc.), which is tedious. In another example, existing technologies require manual labelling of data to obtain a ground truth.

Various embodiments of the present disclosure provide one or more technical solutions to the technical problems described above, as well as other problems. In operation, various embodiments of the present disclosure are directed to distinguishing documents based on feeding pages of the documents through a machine learning model that learns sequential characteristics or feature relationships between pages. In operation, based at least in part on deriving relationship information (e.g., via a Long Short Term Memory (LSTM) model) between a first and second page, embodiments can estimate whether the second page belongs to a same document as the first page or whether the second page belongs to a different document. Such estimation can be done for each page that belongs to each document, and there may be multiple (e.g., 20) documents and multiple (e.g., 30) pages for each document. For example, using an LSTM that encodes page characteristic information sequentially, embodiments can determine that the first page was numbered page 1, and that it contained a particular natural language sequence (e.g., "we have determined that you . . . "). Further, embodiments can determine that the second page was numbered page 2, and that it includes a continuation of the particular natural language sequence (e.g., " . . . owe the party X dollars."). Accordingly, it can be determined that the first page and second page are part of the same document based on sequentially encoding characteristic information from each page and determining the corresponding patterns (e.g., that a page transitioned from page 1 to page 2).

Various embodiments of the present disclosure improve the accuracy of existing technologies. As described above, existing technologies predict whether a first page is of a certain class at a page level without regard to the precise sequence context of pages that are before and/or after the first page. Conversely, particular embodiments distinguish documents (e.g., via an LSTM) by using sequence context or page characteristic relationships before and/or after currently analyzed pages. For instance, embodiments estimate whether a second page (that immediately follows a first page) belongs to a same document as the first page based at least in part on learning characteristic relationships between the first page and second page (e.g., a stop in letterhead format, a continuation in letter style, a continuation of a sentence, a page numbering continuation, etc.). Because features located in prior or future pages provide strong indicators whether a page being currently processed belongs to a particular document, these embodiments improve existing technologies.

Various embodiments of the present disclosure further improve the accuracy of existing technologies by training on actual user data, as opposed to training on synthetic data that must be manually labeled. For example, actual customer invoices, each with multiple pages, can already be defined by customers as identifying a particular invoice. This actual user data may be used to create the ground truth for models, as opposed to labeled synthetic data that is not real user data. This means that because the data reflects actual user data (instead of synthetic) that is presumably identified by users as belonging to particular documents, at runtime or prediction time, the predictions will likely be more accurate, as the ground truth is accurately indicated. For instance, a customer may upload a series of different invoices needing to be processed. That customer's prior invoices, however, may have already been used for training in order to learn sequential characteristic and other patterns for those invoice pages. Accordingly, the prediction for that customer will be highly accurate.

Particular embodiments also improve the user experience and model building experience. As described above, existing technologies also negatively affect the user experience based on tedious manual user input. Various embodiments do not require tedious manual user input to define what pages belong to particular documents. Rather, particular embodiments automatically determine which pages belong to particular documents based on unique rules or functionality (e.g., patterns or relationship information derived from a LSTM).

Various embodiments also do not require manual feature engineering (or manual labelling of data, as described above). Rather, various embodiments perform automated functionality to derive feature vectors that act as input into a model (e.g., an LSTM), thereby removing the requirements for manual data cleaning or other pre-processing. For example, various embodiments first run a set of documents through a first machine learning model (e.g., a Convolutional Neural Network (CNN)) in order to automatically derive a series of feature vectors that each represent individual characteristics of each page of a document. Those feature vectors are then responsively and automatically fed into a sequence learning model (e.g., a LSTM) as input. Various sequence learning models cannot take raw input (e.g., image data) but need to have the data processed in some way. However, instead of manually cleaning or otherwise pre-processing the data as is the case with existing technologies, various embodiments automatically process documents via a sequence learning model based on deriving feature vectors needed from other models, as described herein. This removes the manual and tedious steps needed for pre-processing, labelling, and the like, thereby improving the user and model building experience.

FIG. 1 is a block diagram of an illustrative system architecture 100 in which some embodiments of the present technology may be employed. Although the system 100 is illustrated as including specific component types associated with a particular quantity, it is understood that alternatively or additionally other component types may exist at any particular quantity. In some embodiments, one or more components may also be combined. It is also understood that each component or module can be located on the same or different host computing devices. For example, in some embodiments, some or each of the components within the system 100 are distributed across a cloud computing system (e.g., the computer environment 1000 of FIG. 10). In other embodiments, the system 100 is located at a single host or computing device (e.g., the computing device 1100 of FIG.

11). In some embodiments, the system 100 illustrates executable program code such that all of the illustrated components and data structures are linked in preparation to be executed at run-time.

System 100 is not intended to be limiting and represents only one example of a suitable computing system architecture. Other arrangements and elements can be used in addition to or instead of those shown, and some elements may be omitted altogether for the sake of clarity. Further, many of the elements described herein are functional entities that may be implemented as discrete or distributed components or in conjunction with other components, and in any suitable combination and location. For instance, the functionality of system 100 may be provided via a software as a service (SAAS) model, e.g., a cloud and/or web-based service. In other embodiments, the functionalities of system 100 may be implemented via a client/server architecture.

The system 100 is generally directed to distinguishing documents by determining whether particular pages of those documents belong to a particular document, according to some embodiments. The system 100 includes a document conversion module 102, a document processing module 104, a document distinguishing module 106, a presentation component 108, a consumer application 112, and storage 125, each of which are communicatively coupled to the network(s) 110. The network(s) 110 can be any suitable network, such as a Local Area Network (LAN), a Wide Area Network (WAN), the internet, or a combination of these, and/or include wired, wireless, or fiber optic connections. In general, network(s) 110 can represent any combination of connections (e.g., APIs or linkers) or protocols that will support communications between the components of the system 100.

The document conversion module 102 is generally responsible for converting (e.g., via PymuPDF) one or more raw documents into another format in preparation for further processing (e.g., by a machine learning model). A "document" as described herein refers to entire object or set of pages that are associated with or belong to a particular event (e.g., a work duty job or series of tasks) or entity (e.g., a company). Each document, however, can have multiple pages. For example, invoice A (which has 5 ages) from Company B can be uploaded and invoice C (which has 10 pages) from company D can be uploaded. In this example, there are only two documents—invoice A and invoice C, even though both have multiple pages.

Often, information is difficult to extract in certain formats (e.g., PDF) and/or the original formats consume unnecessary computer memory resources. Accordingly, data may be converted from one format to another in order to extract all features of a document, save on memory resources, and the like all while maintaining high image quality. For example, the document conversion module 102 can automatically convert a PDF document of several pages into an image file output format (e.g., jpg, .png, .bmp, .tiff, etc.), such as via a PDF-to-JPG converter. JPEG, for example, is a file format that can contain image with 10:1 to 20:1 lossy image compression technique via conversion. With this compression technique embodiments can reduce the image size of images contained within PDF documents without losing the image quality.

In some embodiments, the document conversion module 103 additionally or alternatively performs functionality by using an Extract Transform Load (ETL) functionality. ETL refers to the concept of pulling (or copying) data from one or more source databases (e.g., storage 125) and writing the pulled data into a target data store (e.g., a data warehouse). Specifically, for the "Extract" operation, data (e.g., raw data) is extracted or read from one or data sources (e.g., different types of databases). For the "Transform" operation, the read data is converted from its previous form (e.g., raw form) into the form it needs to be in so that it can be placed in another database. Transform occurs by using lookup tables, one or more rules, or combining the read data with other data. In an illustrative example of the Transform operation, several unrelated documents can be joined. In another example, the Transform operation can additionally or alternatively clean, sort, validate, and/or prepare the read data. For the "Load" operation, the transformed data from the "Transform" operation is then written into a target data store. For example, using the illustration above, the joined documents can be output in a single view.

Alternatively or additionally, the document conversion module 102 performs functionality by performing machine learning pre-processing steps on one or more documents, such as data wrangling, data munging, scaling, and the like. Data wrangling and data munging refers to the process of transforming and mapping data from one form (e.g., "raw") into another format with to make it more appropriate and useable for downstream processes (e.g., predictions). Scaling (or "feature scaling") is the process of changing number values (e.g., via normalization or standardization) so that a model can better process information. For example, the document conversion module 102 can bind number values between 0 and 1 via normalization.

The document processing module 104 is generally responsible for encoding (e.g., via converting image data to feature vectors) the characteristics or features of one or more pages of each document to make a prediction or determination (e.g., classify objects within a document). In some embodiments, the document processing module 104 takes, as input, the output (e.g., structured data) performed by the document conversion module 102. Similarly, in some embodiments, the document conversion module 102 represents an executable set of code instructions that calls the document processing module 104 so that the document processing module 104 can responsively perform its functionality.

For example, some embodiments use computer vision, object detection, and/or image classification techniques (e.g., Convolutional Neural Networks). In an illustrative example of object detection functionality, particular embodiments use one or more machine learning models (e.g., a Convolutional Neural Network (CNN)) to generate a bounding box that defines the boundaries and encompasses a computer object representing a feature (e.g., a page number, a paragraph, a format feature, a letter style (e.g., Times New Roman) feature, etc.) of a document. These machine learning models can also generate a classification prediction that the computer object is a particular feature. In computer vision applications, the output of object detection can be encompassed by a bounding box. A bounding box describes or defines the boundaries of the object in terms of the position (e.g., 2-D or 3-D coordinates) of the bounding box (and also the height and width of the bounding box). For example, the bounding box can be a rectangular box that is determined by its x and y axis coordinates. This gives object recognition systems indicators of the spatial distinction between objects to help detect the objects in documents. In an illustrative example, on a first page, a first bounding box can be generated over a page number and labeled as "page 1", a second bounding box can be generated over a paragraph and labeled "third paragraph", and a third bounding box can be generated over an object (e.g., a mountain image) and labeled "mountain".

In some embodiments, one or more machine learning models can be used and trained to generate tighter bounding boxes for each object. In this way, bounding boxes can change in shape and confidence levels for classification/prediction and can be increased based on increased training sessions. For example, the output of a Convolutional Neural Network (CNN) or any other machine learning model described herein can be one or more bounding boxes over each feature of an image (corresponding to a feature in a document), where each bounding box includes the classification prediction (e.g., this object is a building) and the confidence level (e.g., 90% probability).

In various embodiments, the document processing module 104 (or a machine learning model used by the document processing module) classifies or otherwise predicts whether various features included in one or more pages of each document belong to certain classes or categories (e.g., the object detected is a paragraph about cars). These predictions or target classifications may either be hard (e.g., membership of a class is a binary "yes" or "no") or soft (e.g., there is a probability or likelihood attached to the labels). Alternatively or additionally, transfer learning may occur. Transfer learning is the concept of re-utilizing a pre-trained model for a new related problem. Moreover, any suitable model type can be used, such as a classifier model (e.g., a CNN classifier), a regression model (e.g., Random Forest Regression model), a clustering model (e.g., K-Means clustering), and the like.

In some embodiments, the document processing module 104 additionally or alternatively uses natural language processing (NLP) or other text processing functionality (e.g., Optical Character Recognition) on documents to determine text features of documents. For example, in some embodiments, the document processing module 104 performs image-to-text functionality (e.g., via an image-to-text converter) to process text via NLP. NLP determines semantic relationships among different words, which includes determining what words have a same or similar (e.g., within a threshold distance when the words represent vectors) meaning, even if they are syntactically different. This is to say, semantic similarity between words on a document page can be determined even if they are syntactically different. "Syntax" or syntactic properties refers to the structure of character sequences of the content (as opposed to the semantics or meaning), such as the structure of a sentence. For example, "car" and "far" are syntactically similar but have two different definitions so they are not semantically similar. Rather, "far" and "distant" are semantically similar because they mean the same thing, even though they are structurally or syntactically different.

In some embodiments, the document processing module 104 uses NLP by tokenizing text (e.g., sentences and paragraphs) on pages into their constituent words, numbers, symbols, and some or each of the words are tagged with a part-of-speech (POS) identifier. "Tokenization" or parsing in various embodiments corresponds to a computer-implemented process that segments the content into words, sentences, symbols, character sequence, and/or other elements of the content. This can include a set of rules for analyzing a message, such as word and/or part of speech (POS) order. For example, for the sentence "the girl jumped happily", the syntax may correspond to a word order where the structure is subject-verb-adverb (or subject, verb, object, etc.). In various embodiments, each word of a page is tagged with identifiers, such POS identifiers.

In some embodiments, NLP derives semantic and syntactic content of semi-structured or unstructured data (e.g., data in image files). This is in contrast to analyzing "structured" data, such as data in a database. NLP can be configured to parse content to determine semantic context (e.g., the meaning of words by analyzing each word in a page against each other and against training data) and syntax context (e.g., the set of rules that govern structure of sentences in a given language). NLP is configured to recognize keywords, contextual information, and metadata tags associated with one or more portions of a set of data. In certain embodiments, NLP analyzes summary information, keywords, text descriptions included in the set of data, and uses syntactic and semantic elements present in this information to identify the interest contexts. The syntactic and semantic elements can include information such as word frequency, word meanings, text font, italics, hyperlinks, proper names, noun phrases, parts-of-speech (e.g., noun, adverb, adjective, and the like) and/or the context of surrounding words. Other syntactic and semantic elements are also possible.

In some embodiments, the document processing module 104 additionally or alternatively uses other NLP-based functionality, such as Named Entity Recognition (NER). NER is an information extraction technique that identifies and classifies elements or "entities" in natural language text into predefined categories. Such predefined categories may be indicated in corresponding tags or labels. Entities can be, for example, names of people, specific organizations, specific locations, specific times, specific quantities, specific monetary price values, specific percentages, specific pages, and the like. Likewise, the corresponding tags or labels can be specific people, organizations, location," time, price (or other invoice data) and the like. In this context of the present disclosure, for example, these tags or labels can indicate whether certain extracted attributes correspond to a "price" of an item, the name of an entity (e.g., a particular corporation), line item information (e.g., description of service or item billed), address of an entity, the particular date listed on the page, or total amount due on an invoice.

In some embodiments, the document processing module 104 additionally or alternatively uses word embeddings to tag or determine that a set of text attributes of one or more pages of a document. In this way, different words or other characters in pages of documents can be converted into feature vectors of numerical values and embedded in feature space based on how semantically similar (e.g., via cosine or Euclidian distance) each word or other character sequence is to each other. In various embodiments, such word embeddings are produced by BERT, WORD2VEC, GloVe, and/or any other suitable word embedding models.

A "word embedding" as described herein includes vectors in feature space (e.g., also known as vector space or linear space) based on a contextual (e.g., semantic) similarity, feature similarity, and/or other similarity. In some embodiments, two or more vectors that are semantically similar (e.g., have the same or similar meaning) may be mapped or embedded near each other in vector space regardless of the syntactic similarity (e.g., similarity between word structure or appearance). Through this semantic relationship functionality, computers can understand how similar words (or extracted attributes of words) are to each other and/or how similar they are to other words (e.g., via cosine distance).

A "feature vector" (also referred to as a "vector") as described herein includes one or more real numbers, such as a series of floating values or integers (e.g., [0, 1, 0, 0]) that represent one or more other real numbers, a natural language (e.g., English) word and/or other character sequence (e.g., a symbol (e.g., @, !, #), a phrase, and/or sentence, etc.). Such natural language words and/or character sequences correspond to the set of features and are encoded or converted into corresponding feature vectors so that computers can process the corresponding extracted features. In some embodiments, the document processing module 104 processes or embeds feature vectors in feature space based on training one or more machine learning models, which is described in more detail below.

The document distinguishing module 106 is generally responsible for estimating whether particular one or more pages belong to a particular document. In some embodiments, this includes determining sequential patterns and/or relationships between different pages of one or more documents. For example, while processing a fourth page that includes a "page 4" feature (e.g., as determined by a word embedding model), the document distinguishing module 106 can also determine that the previous three pages sequentially included characteristics "page 3" "page 2" and "page 1" (e.g., as determined by the word embedding model) in that order (e.g., and in the same font and same bottom position of the page, as determined via bounding box position). Accordingly, the document distinguishing module 106 can infer that the fourth page is a continuation of the third page and therefore belongs to the same document as the previous three pages given that the first three pages were sequentially numbered in the same font at the same position.

In some embodiments, the document distinguishing module 106 takes, as input, the output provided by the document processing module 104 in order to make further predictions regarding the sequence of pages given the various characteristics and/or predictions made by the document processing module 104. In this way, for example, the document processing module 104 can programmatically call the document distinguishing module 106 to trigger the document distinguishing module 106's functionality.

In some embodiments, the document distinguishing module 106 represents or uses a second machine learning model that processes data by sequentially encoding particular feature vectors based on learned relationships of the sequences. For example, some embodiments convert each feature vector of a page from left to right in an ordered fashion into another concatenated feature vector to generate vectors indicating patterns/relationships. In some embodiments, such sequential encoding includes using a 1-dimensional and/or 2-dimensional bi-directional Long Short Term Memory (LSTM) model to encode sequential data into a concatenated or aggregated feature vector of multiple values representing multiple pages in a document. LSTMs are a type of recurrent neural network (RNN) capable of learning order dependence in sequence prediction problems. Various embodiments benefit from these models because of the inherent sequence and order of values (e.g., page numbers, paragraph numbers, etc.) within documents. The LSTM model may be 1-dimensional because it can only read data in one dimension or direction (e.g., from left to right of pages 1 to 4).

A 2-dimensional bi-directional Long Short Term Memory (BiLSTM) model sequentially reads each entry of an object (e.g., pages 1 through 4 and 4 through 1 in parallel) to aggregate feature vectors in to contextualized vectors. A "2-dimenional" bi-directional LSTM processes 2-dimensional input (e.g., columns and rows or pages of different documents). A one-dimensional BiLSTM, takes in 1-dimensional sequential data. LSTMs and BiLSTMs are described in more detail below.

The presentation component 108 is generally responsible for causing presentation of content and related information to user devices, such as an indicator or other identifier indicating that a particular set of pages belong to a particular document based on functionality performed by the document distinguishing module 106. The presentation component 108 may comprise one or more applications or services on a user device, across multiple user devices, or in the cloud. For example, in one embodiment, presentation component 108 manages the presentation of content to a user across multiple user devices associated with that user. Based on content logic, device features, associated logical hubs, inferred logical location of the user, and/or other user data, presentation component may determine on which user device(s) content is presented, as well as the context of the presentation, such as how (or in what format and how much content, which can be dependent on the user device or context) it is presented and/or when it is presented.

In some embodiments, the presentation component 108 generates (or causes generation of) user interface features. Such features can include interface elements (such as graphics buttons, sliders, menus, audio prompts, alerts, alarms, vibrations, pop-up windows, notification-bar or status-bar items, in-app notifications, or other similar features for interfacing with a user), queries, and prompts. In some embodiments, the presentation component 108 generates structured data, tagged data or otherwise causes presentation of structured or tagged data that was previously unstructured, semi-structured, or untagged. For example, in some embodiments the presentation component 108 causes presentation of NER and/or POS tags, as described with respect to the document processing module 104, which may have been previously unstructured or otherwise been in a different form (e.g., existed only in natural language form) than the output provided by the presentation component 108. In this way, some embodiments convert input data to an output that is different than the input.

The consumer application 112 generally refers to one or more computer applications or services, such as online/cloud applications or locally stored apps that consume, include, or utilize some or each of the components of the system 100. In particular, a consumer application 112 may receive or upload a plurality of documents, each document with a plurality of pages. The document conversion module 102, the document processing module 104, and the document distinguishing module 106 may responsively perform its functionality, as described with respect to the system 100. For example, a user (or set of users) may upload several invoice documents as a single file with no indication of what pages belong to which invoices or the ending/beginning pages of invoices. This would typically require users to manually read each uploaded page to determine which document it belongs to. However, embodiments of the present disclosure can automatically process documents, as described with respect to the document conversion module 102, the document processing module 104, and the document distinguishing module 106.

In some embodiments, the consumer application 112 utilizes the presentation module 108 to cause presentation of document identifiers and their corresponding page identifiers. Examples of consumer applications 126 may include, without limitation, computer applications or services for automated transaction systems (e.g., Bill.Com), social media service applications (e.g., PINTEREST, FACEBOOK, etc.), email, messaging, chat, or any other web application, plugin, extension, or locally stored application.

The storage 125 (e.g., a database, RAM, cache, persistent storage, etc.) can include documents, different training data (e.g., labeled documents) that have been used to train deep neural networks or other machine learning models, as described in more detail below. Additionally or alternatively, storage 125 can include the maps, data structures, or routines needed by the components of the system 100.

Figure 2:
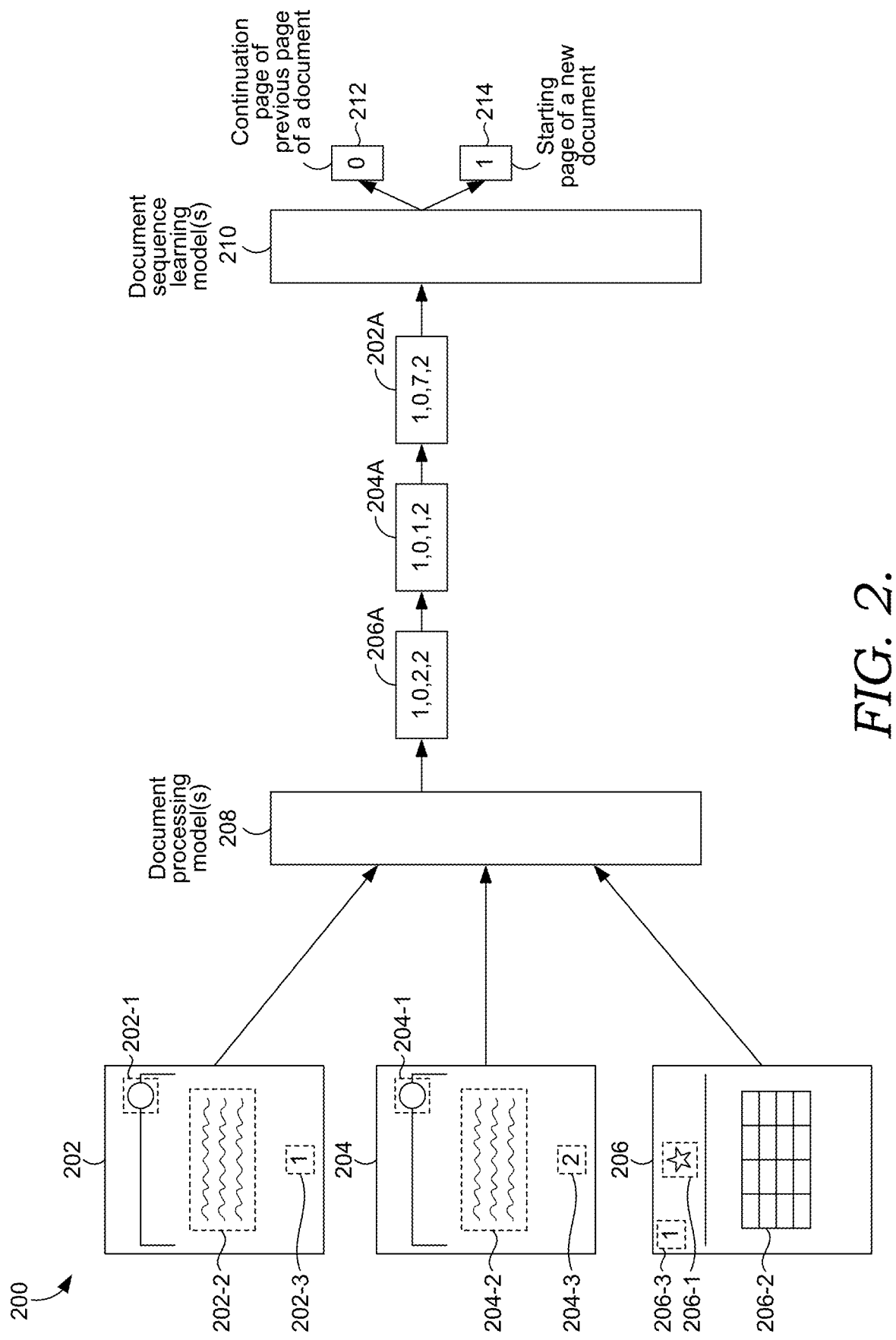
FIG. 2 is a schematic diagram illustrating how attributes or characteristics of pages of different documents are extracted an analyzed for document sequence predictions, according to embodiments.

FIG. 2 is a schematic diagram illustrating how attributes or characteristics of pages of different documents are extracted and analyzed for document sequence predictions, according to embodiments. In some embodiments, the document processing model(s) 208 (e.g., a computer-vision machine learning model) represents the functionality used by the document processing module 104, as described with respect to FIG. 1. Likewise, in some embodiments, the document sequence learning model(s) 210 (e.g., an LSTM) represents the functionality used by the document distinguishing module 106, as described with respect to FIG. 1.

As illustrated in FIG. 2, different characteristics of each page, such as natural language characters (e.g., sentences, page numbers) and symbols from each pace are extracted, tokenized, and converted into corresponding feature vectors that are embedded in the feature space via the document processing model(s) 208. For example, regarding the page 202, the symbol 202-1, the natural language text 202-2, and the page number 202-3 (and/or the X, Y coordinate positioning of this information (e.g., via a bounding box)) are encoded and aggregated (e.g., via a dot product), via the document processing model(s) 208, to the corresponding embedded feature vector 206A. The embedded feature vector 206A represents each detected feature of the corresponding page 202, except that the detected features are machine-readable (e.g., contains integers, as opposed to natural language characters). Such features may be indicated in terms of distance (e.g., Euclidian distance) or feature vector values, which indicate the relationships between features of a single document. In this way, each embedded feature vector represents intra-value relationships between each detected feature of each document. Likewise, the data (i.e., 204-1, 204-2, and 204-3) within pages 204 and data (i.e., 206-1, 206-2, and 206-3) of page 206 are likewise processed via the document processing model(s) 208 to derive the embedded features 204A (representing page 204) and 206A (representing page 206) respectively.

In some embodiments, the document processing model(s) 208 represent at least two different machine learning models, where a first model (e.g., a CNN) processes symbol or picture data, and/or positioning (e.g., X, Y coordinates) as input, and a second model takes natural language characters as input to perform NLP (e.g., as described with respect to the document processing module 104 of FIG. 1). For example, with respect to the page 202, a first feature vector indicating information and positioning data from the symbol 202-1 and the page number 202-3 can be generated via an object detection model. Additionally, a second embedded feature vector indicating the natural language text 202-1 can be generated via a BERT model to understand the semantic and syntactic features of the text 202-1. This can occur for one or more of the other pages 204 and 206.

In response to the document processing model(s) 208 performing its functionality, the document sequence learning model(s) 210 takes the output feature vector embeddings 206A, 204A, and 202A, as input to classify, at 212, each feature vector (representing a specific page or characteristics of a page) as a continuation page of a previous page via the binary 0 value or classify, at 213, each feature vector as a starting page of a new document via the binary 1 value. In other words, the document sequence learning model(s) 210 make predictions that are indicative of whether each page belongs to a first document or other document(s) based on the sequence (e.g., forward or backward) context of specific characteristics of the previous and/or subsequent pages in relation to a currently analyzed page.

In an illustrative example of the functionality performed by the document sequence learning model(s) 210, the page 202 (and not other pages) may first be processed through the document processing model(s) 208 and be represented as the feature vector 202A. Because page 202 is the first page being processed (e.g., because 1-dimensional LSTM is being used), the page 202 (or more specifically, its corresponding embedded feature vector 202A) is classified with 1 (i.e., as the starting page of a new document) via 214. Subsequently, the page 204 is processed through the document processing model(s) 208 to derive the feature vector 204A. Responsively, the document sequence learning model(s) 210 determine relationships or patterns between the feature vectors 202A and 204A (corresponding to pages 202 and 204). For example, the document sequence learning model(s) 210 can determine that feature vectors 202A and 204A are within a distance (e.g., Euclidian distance or Cosine distance) threshold of each other in feature space. This may be indicative, for example, of the page numbers 202-3 and 204-3 being in the same bottom position of the document, the symbols 202-1 and 204-1 being identical and in the same position on the page. The slight differences in distance may be due to the differing values (page 1 v. page 2) in page numbers at 202-3 and 204-3 and the differences in natural language text via 202-2 and 204-2. However, certain models, such as NLP-based models (e.g., BERT) can predict that the text features 204-2 is a continuation of the text 202-2 and/or that "page 2" is continuation of "page 1." In this way, the document sequence learning model(s) 210 can represent or use NLP-based models.

In various embodiments, based on the distance between the feature vectors 202A and 204A being within a threshold, the document sequence learning model(S) 210 predicts that the pages 202 and 204 belong to the same document. More specifically, page 2 or feature vector 204A is flagged as 0 via 212 indicating that page 204 is a continuation page of the previous page 202.

Continuing with this example, responsive to the page 204 (and 202) being processed by the document sequence learning model(s) 210, the document sequence learning model(s) 210 makes a classification for page 206 based on characteristics of the pages 202 and 204 (or more specifically feature vector values of the feature vectors 202A and 204A). For example, the document sequence learning model(s) 210 may determine that the distance between the feature vector 206 A and 204A, 202A are outside of a distance threshold. In some embodiments, the document sequence learning model(s) 210 further concatenates or aggregates (e.g., via a dot product) both feature vectors 202A and 204A into another separate concatenated feature vector so that only the concatenated feature vector is compared to the feature vector 206A for distance determination between the concatenated feature vector and the feature vector 206A.

The feature vectors being outside of a distance threshold may be indicative, for example, of the page numbers 202-3 and 204-3 being in a different position of the document relative to 206-1 (bottom of page versus top of page), the symbols 202-1 and 204-1 being different relative to 206-1 and in different positions on the page, and the table object 206-2 not being included in any of the pages 202 or 204. The differences in distance may further be due to a determination that the pages started over in page number (from pages 1 to 2 in pages 202 and 204), to page 1.

In various embodiments, based on the distance between the feature vector 206A and 204A, 202A (e.g., a concatenated single feature vector representing both pages 202 and 204) being outside (or exceeding) a threshold, the document sequence learning model(S) 210 predicts that the page 206 belongs to a different document than pages 202 and 204. More specifically, feature vector 206A is flagged as 1 via 214 indicating that page 206 is a starting page of a new document.

Figure 3:
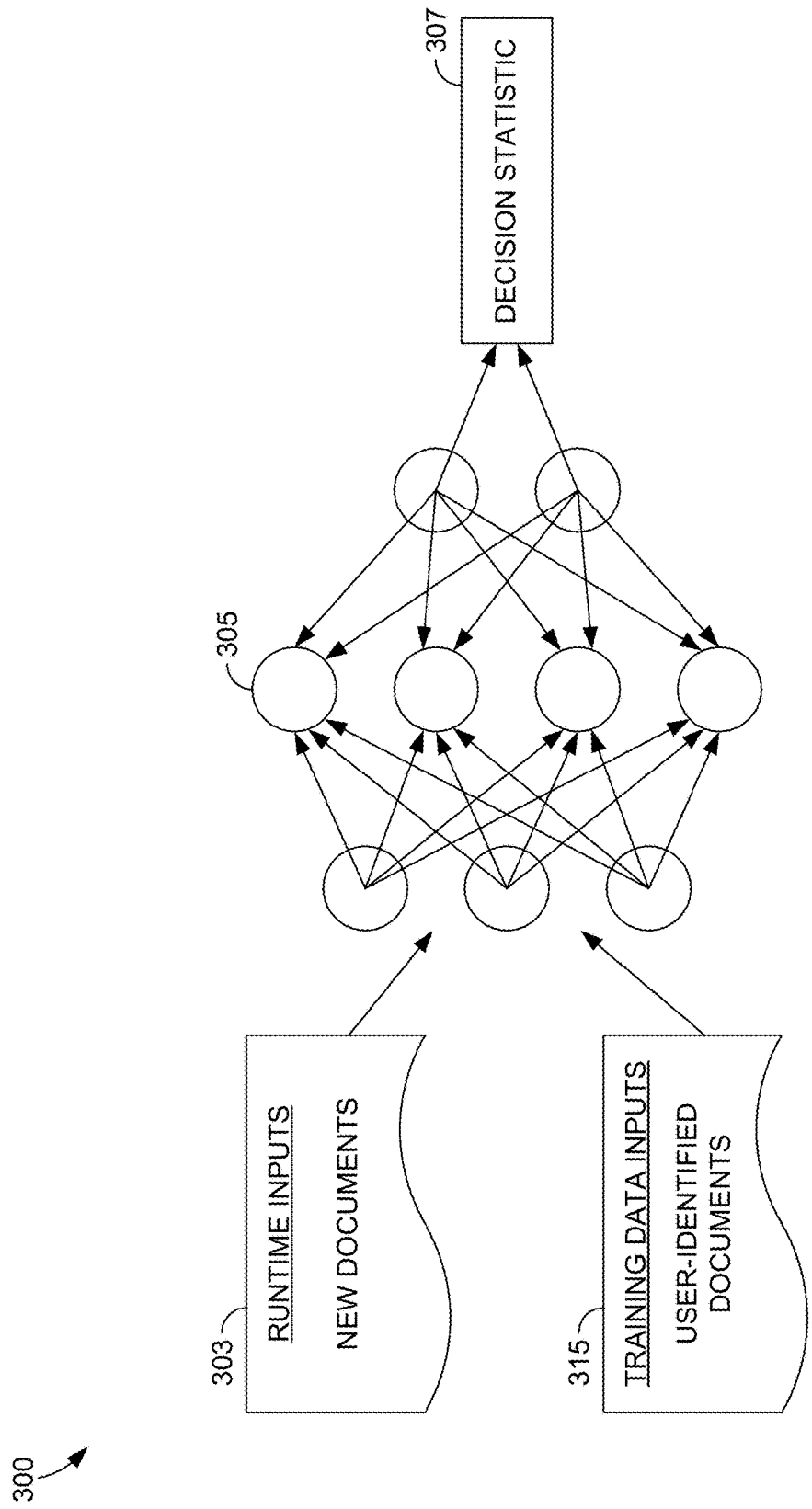
FIG. 3 is a schematic diagram illustrating how a decision statistic is generated using one or more machine learning models, according to some embodiments

FIG. 3 is a schematic diagram illustrating how a decision statistic is generated using one or more machine learning models, according to some embodiments. In some embodiments, FIG. 3 represents the data and functionality used by the document processing module 104 and/or the document distinguishing module 106. In some embodiments, FIG. 3 represents functionality performed by the document processing model(s) 208 and/or the document sequence learning model(s) 210 of FIG. 2.

FIG. 3 illustrates that one or more of the runtime input(s) 303 are fed or processed through the machine learning model(s) 305 to make a prediction, such as predicting what features are in a document and/or predicting whether a page is a continuation page of an existing document or a starting page of a new document (e.g., via 212 or 214 of FIG. 2). Although the runtime input(s) 303 indicate specific inputs, they are representative only and more or fewer inputs may be used.

The one or more machine learning models 305 generates one or more particular decision statistic predictions 307 (e.g., a classification prediction of a classifier model, a clustering prediction of a clustering model, or a regression prediction for a regression model) given the runtime input(s) 303. Such machine learning model(s) 305 may be any suitable model of any suitable type. For example, such machine learning model(s) can be supervised or unsupervised and can be or include a neural network (e.g., a Convolutional Neural Network (CNN) or Siamese Neural Network), decision trees, random forests, support vector machine, Naïve Bayes, and or clustering (e.g., K-means clustering). Accordingly, although the machine learning model(s) 305 is represented as a neural network, it is understood that any suitable machine learning model (or combination of models) can alternatively or additionally be used. In an illustrative example of the decision statistic(s) 307, the machine learning model(s) 305 may classify a feature vector as 0 or 1, which is indicative of whether a particular page is a continuation page of a previous page of a document or a starting page of a new document, as described, for example, with respect to 212 and 214 of FIG. 2. Additionally or alternatively, a model can detect or predict objects and their orientations (e.g., via object detection), such as described, for example, with respect to the document processing model (s0 208.

In certain embodiments, the decision statistic(s) 307 may either be hard (e.g., membership of a class is a binary "yes" or "no") or soft (e.g., there is a probability or likelihood attached to the labels). Alternatively or additionally, transfer learning may occur. Transfer learning is the concept of re-utilizing a pre-trained model for a new related problem.

In some embodiments, the machine learning model(s) 305 converts or encodes the runtime input(s) 303 and/or training data input(s) 315 into corresponding feature vectors in feature space. In various embodiments, the machine learning model(s) 305 learn, via training, parameters or weights so that similar features are closer (e.g., via Euclidian or Cosine distance) to each other in feature space. In some embodiments, this training is done in supervised manner using a loss function (e.g. Triplet loss or GE2E loss) that try to map similar features into one classification or cluster. Training can occur on any suitable training data input(s) 315, such as user-identified documents.

Examples of user-identified documents include, for example, existing client invoice documents and their corresponding pages. This user data may be used for training the model(s) 305. Accordingly, there is no extra need for labelling, since the users' records are used to create the ground truth. For instance, a user may have previously uploaded a document with several pages that have already been separated (or identified) by users to generate different invoices or bills (or other documents). For example, a user may have uploaded an invoice with multiple pages with a message that says, "This invoice will be billed to company X." Various embodiments, can then determine (e.g., via NLP) that each page of the uploaded document belongs to the document. In other words, users can generate messages so that an inference can be made that each page belongs to a particular document. In some embodiments, users explicitly indicate that pages belong to a particular document, such as by writing, "pages 1 through 20 indicates a bill to company X, and pages 21 through 50 indicates a bill to company Y." Accordingly, embodiments can learn page-based and/or sequential features between the pages (e.g., via the document processing model(s) 208 and/or the document sequence learning model(s) 210) with these user-defined labels, which removes model building steps of labelling data.

Some embodiments use around 150,000 multi-page documents (i.e., the user-identified documents 315) uploaded to the inbox to train, validate and then test. In various embodiments, each document is separated or used as a whole by customers to generate invoices or bills, which is recorded in a data store as each page of a document with the associated page number of a bill, for example. As described above, in some embodiments, the records of the users' action in production are used to get the ground truth, where 1 represents the new start of a separation or document and 0 represents the continuation of the current separation or document. Various embodiments divide the dataset into 3 subsets for training, validation, and testing with 80%, 10%, and 10%, respectively.

First, in some embodiments, a computer vision model (e.g., an Inception model) is used to get the visual representation of each page of a document (e.g., as described with respect to the document processing model(s) 208). As described with respect to the document conversion module 102, some embodiments in a PDF format are converted into images for each page by PymuPDF in greyscale. In some embodiments, the resolution of the input image is 224 by 224 for MobileNet and 1100 by 850 for the Inception model. In some embodiments, the resolution is generic or any other value, depending on the computer vision model used. The output of the model, in some embodiments, is a vector with length of 1024 for MobileNet and 2048 for the Inception model. In other embodiments, the output length is generic or any other value, depending on the computer vision model and the last layers used. Because various embodiments use computer vision or other document processing models, there is no need for feature engineering, as the feature vector embeddings output by these models are directly derived by a document sequence model (e.g., a LSTM). In some embodiments, the computer vision model is fine-tuned during the training process. Fine-tuning takes a model that has already been trained for a particular task and then fine-tuning or tweaking it to make it perform a second similar task. For example, a deep learning network that has been used to recognize invoices (or any object within invoices, such as a table) can be fine-tuned to recognize other documents, such as books (or any other objects in invoices, such as page numbers). Specifically, fine-tuning means taking weights of a trained neural network and use it as initialization for a new model being trained on data from the same domain (e.g., documents). Fine-tuning can thus be used to improve accuracy, overcome a small dataset size, and/or speed up training.

In some embodiments, responsive to the MobileNet and Inception model processing, a LSTM model taking a page sequence with the length of 20 embeddings (representing 20 pages) is trained using Tensorflow Keras on AWS sageMaker to optimize labelling 1 for a new start of a separation and 0 for a continuation of the current separation. However, the length of the page sequence typically depends on the number of pages in each document. Further, the labeling may be more generic based on pre-defined document classes. For example, embodiments can use different numbers representing different document types (e.g., invoice v. receipt, etc.).

Various embodiments can represent one or more feature vectors representing the input(s) 315 in vector space by aggregating (e.g. mean/median or dot product) the feature vector values to arrive at a particular point in feature space (e.g., an "embedded feature vector"). For example, in supervised learning contexts, a training component can receive a document of user pages a specific user-identified label, such as "Company X invoice." Embodiments, can then run the document with the corresponding labels through the machine learning model(s) 305 so that different feature values and weights are learned according to the label. In this way, when pages are received, corresponding weights or features can be learned.

In some embodiments, the training component of the machine learning model(s) 305 learns features from the training data input(s) 315 and responsively weights them during training. A "weight" in the context of machine learning represents the importance or significant of a feature or feature value for prediction. For example, each feature may be associated with an integer or other real number where the higher the real number, the more significant the feature is for its prediction. In some embodiments, a weight in a neural network or other machine learning application can represent the strength of a connection between nodes or neurons from one layer (an input) to the next layer (an output). A weight of 0 may mean that the input will not change the output, whereas a weight higher than 0 changes the output. The higher the value of the input or the closer the value is to 1, the more the output will change or increase. Likewise, there can be negative weights. Negative weights proportionately reduce the value of the output. For instance, the more the value of the input increases, the more the value of the output decreases. Negative weights may contribute to negative scores.

In another illustrative example of the training component, some embodiments learn an embedding of feature vectors based on learning (e.g., deep learning) to detect similar features between training data input(s) 315 in feature space using distance measures, such as cosine (or Euclidian) distance. For example, each training data input 315 is converted from string or other form into a feature vector where each value or set of values represents the individual features of the page (and/or concatenated pages) in feature space. Feature space (or vector space) is a collection of feature vectors that are each oriented or embedded in space based on an aggregate similarity of features of the feature vector. Over various training stages or epochs, certain feature characteristics for each input(s) 315 can be learned or weighted. For example, for a first image in a document, the most prominent feature may be a first page format pattern, whereas other features change considerably or are not present, such as the text within a page. Consequently, patterns of the first pattern can be weighted (e.g., a node connection is strengthened to a value close to 1), which is indicative of the label taking on this feature (whereas other node connections representing the second set of symptoms are weakened to a value closer to 0). In this way, embodiments learn weights corresponding to different features such that similar features found in inputs contribute positively for predictions.

In some embodiments, learning or weighting includes changing an embedding in feature space of a feature vector representing a page as more training epochs occur. For example, after a first round or epochs of training, it may be unknown which of the extracted features are important for taking on a certain classification or prediction. Accordingly, each feature may take on equal weight (or close to equal weight within a threshold, such as a 2% changed weight) such that all of the input feature vectors are substantially close or within a distance threshold in feature space. However, after several rounds of training or any threshold quantity of training, these same feature vectors may adjust or change distances from each other based on the feature value similarity. The more features of two feature vectors that match or are within a threshold value, the closer the two feature vectors are to each other, whereas when features do not match or are not within a threshold value, the further away the two feature vectors are from each other. Accordingly, for example, a trained embedding may look similar to the feature space 500 of FIG. 5.

In various embodiments, subsequent to the machine learning model(s) 305 training on the training data input(s) 315 (and/or testing), the machine learning model(s) 305 (e.g., in a deployed state) receives the runtime input(s) 303. In various embodiments, In some embodiments, the input(s) 303 are automatically converted to one or more feature vectors and mapped in the same feature space as vector(s) representing the training data input(s) 315. Responsively, some embodiments determine a distance (e.g., a Euclidian distance) between the one or more feature vectors and other vectors representing the training data input(s) 315, which is used to generate the decision statistic(s) 307.

Figure 4:
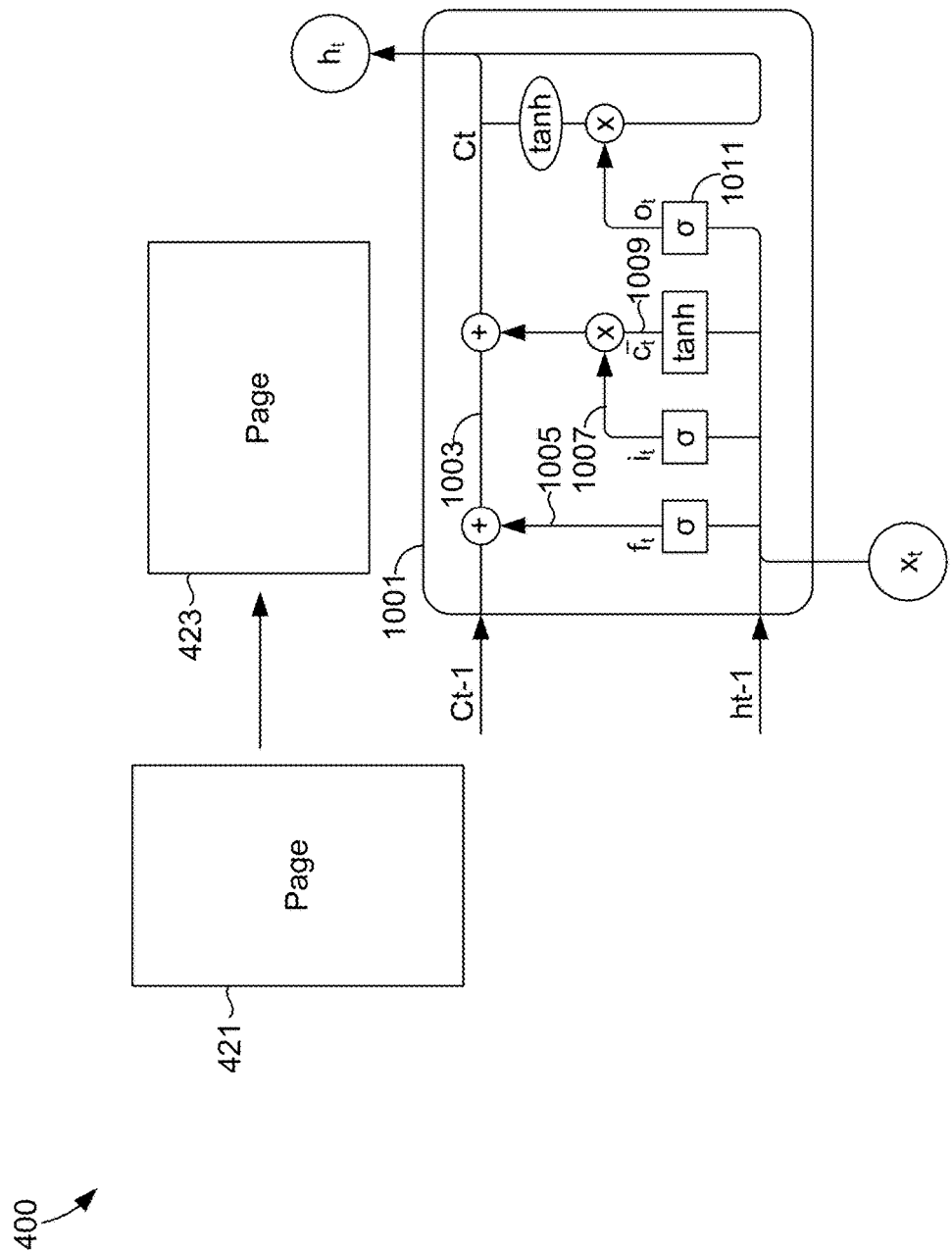
FIG. 4 is a schematic diagram illustrating how vectors are directionally or sequentially encoded using a Long Short Term Memory (LSTM) model, according to some embodiments.

FIG. 4 is a schematic diagram illustrating how vectors are directionally or sequentially encoded (e.g., across different pages and/or documents) using a Long Short Term Memory (LSTM) model 400, according to some embodiments. In some embodiments, the LSTM 400 represents the functionality derived from or performed by the document distinguishing module 106 of FIG. 1, the document sequence learning model(s) 210 of FIG. 2, or the machine learning model(s) 305 of FIG. 3. Although FIG. 4 illustrates an LSTM, it is understood that this is illustrative only and that any quantity or type of suitable components can exist. For example, in some embodiments, other models (e.g., a Hidden Markov Model (HMM), Gaussian Mixture Model (GMM), or BiSLTM) that learn sequential information can alternatively be used instead of an LSTM.

FIG. 4 illustrates how feature vectors can be aggregated and concatenated sequentially. The LSTM model function assumes that a downstream event (or later-in-time event, such as a last page in a document) depends upon, and is a function of, one or more events that came before (e.g., a previous page of a document). In other words, LSTM is a model that shares weights over time. In a document encoding context, the model can learn page feature patterns over time based on past page feature observations (e.g., determine that the first three pages of a document indicate specific company names, so the next page of the same document is likely to recite the specific company name as well).

Element or cell 401 represents a feature vector representing the feature values of the page 423. In an illustrative example, the cell 401 may represent the features 204-1, 204-2, and 204-3 of the page 204, as described with respect to FIG. 2. The cell state 403 corresponds to selective memory of past cell states (i.e., it takes data (e.g., feature vector values) that has been forgotten or disregarded and data that has been remembered or preserved) and passes on remembered data to the next cell or step (e.g., a next entry corresponding to a next page of a document). When data arrives at the last cell (e.g., representing the last page in a document (e.g., 423 )), $C_t$ is linearly combined with $h_{t+1}$ such that $h_{t+1}$ is the final output.

In various embodiments, the first operation occurs when the forget gate layer 405 (a sigmoid layer) determines what vector values gets removed from the cell state 403, as represented by $f_t = \sigma(W_f \cdot [h_{t-1}, x_t] + b_f)$. It takes $h_{t-1}$ (e.g., the previous cell state corresponding to previous feature values in the previous page 421) and $x_t$ (current vector values) and outputs a number between 0 and 1. A value close to or within a threshold of value of 1 indicates true or keep this data while a 0 or value within a threshold value of 0 indicates forget or get rid of the data. A previous cell state indicates at least a portion the vector values that were passed from the previous cell, as opposed to the overall cell state that indicates at least a portion the data that was passed for at least a portion of cells up until a particular point.

In various embodiments, the next operation is to determine what information will be stored or moved along the cell state 403, as represented by $i_t = \sigma(W_i \cdot [h_{t-1}, x_t] + b_i)$; $\tilde{C}_t = \tanh(W_C \cdot [h_{t-1}, x_t] + b_C)$. This occurs via the input gate layer 407 (another sigmoid layer) and the tanh layer 409. The gate layer 407 determines which vector values will be updated and the tanh layer 409 generates a single vector of new candidates $\tilde{C}_t$. In an example illustration, embodiments can forget page 421 feature values or vector representations that are: duplicative, noisy, are below and/or above some threshold, such as surpassing a number of predefined words or other character sequence, and/or contain extraneous information not analyzed or encoded, such as certain symbols and the like.

Certain embodiments then update the old cell state 403 ($C_{t-1}$) into the new cell state $C_t$, as represented by $C_t = f_t * C_{t-1} + i_t * \tilde{C}_t$. Accordingly, the old cell state ($C_{t-1}$) is multiplied by 405, forgetting the vectored values described above. Then, the input gate layer 407*the tanh layer 1009 is added. In the last step, it is determined what is outputted, which is represented by $o_t = \sigma(W_o[h_{t-1}, x_t] + b_o)$; $h_t = o_t * \tanh(C_t)$. The output is based on the new cell state $C_t$, which is a filtered version of the cell state. A sigmoid layer determines what parts of the cell state 403 ($C_t\_1$) will be output. The cell state 403 is run through tanh so that the values are between −1 and 1, represented by the final output $h_{t+1}$. And this is multiplied by the sigmoid gate 411 so only the necessary values are outputted. In various embodiments, the final output $h_{t+1}$ includes a concatenated feature vector or contextualized vector that aggregates some or each page feature values of one or more documents, as described herein. For example, the output can be a concatenated feature vector that represents each sequential page of a document. In a 2-dimensional context, this functionality can be repeated for different sequences, such as rows and columns, first page through last page, and last page through first page. Accordingly, the output of the cell 401 (e.g., assuming that this is the last page) is a single vector where each value of the vector is a non-binary (e.g., float, integer, decimal) between −1 and 1. Some embodiments additionally use a classifier model to make predictions based on the final concatenated vector representing several pages, such as determining a distance between feature vectors to classify as 1 or 0, as described, for example, with respect to 212 and 214 of FIG. 2, or determine distances, as described with respect to FIG. 5. Some embodiments, additionally use a classifier model to make document type predictions based on the final concatenated vector representing several pages. For example, a classifier may classify a document as an "invoice" based on the sequential LSTM context indicating financial data on each page, the orientation of page numbers on each page, the orientation of letterhead format, on each page, and the like. In another example, a classifier may classify a document as a "digital book" based on the column breaks on the pages, the sequence context of a title page first, followed by chapter headings, and then natural language text.

Figure 5:
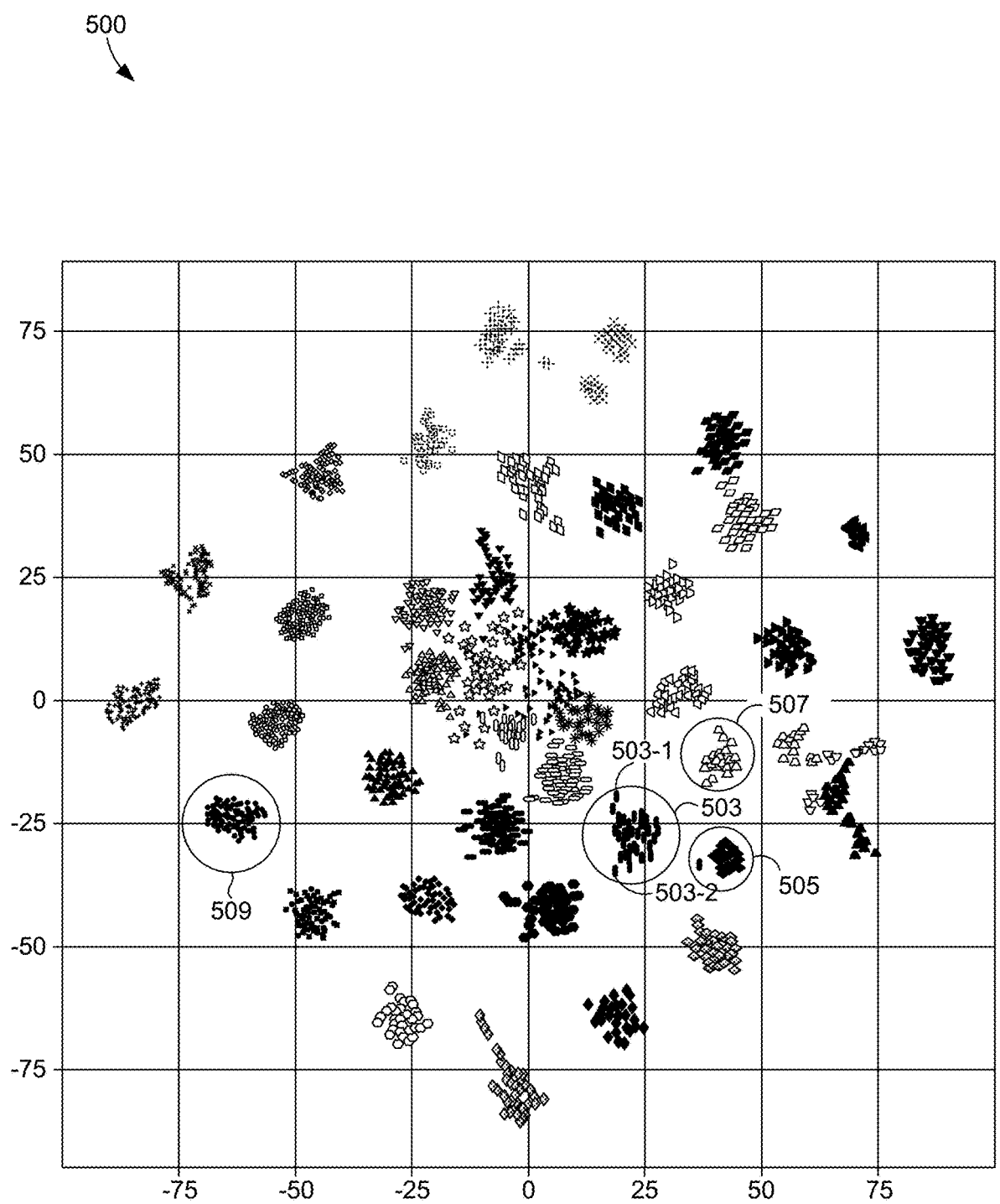
FIG. 5 is a schematic diagram of an example visualization of feature space that illustrates various feature vectors representing one or more pages that have been clustered or classified, according to some embodiments.

FIG. 5 is a schematic diagram of an example visualization of feature space 500 that illustrates various feature vectors representing one or more pages that have been clustered or classified, according to some embodiments. In some embodiments, the feature space 500 represents the functionality produced (or used) by the document processing module 104, document distinguishing module 106, document processing model(s) 208, and/or the document sequence learning model(s) 210. In an illustrative example of FIG. 5, if a first feature vector representing a page is mapped in feature space to a first cluster, where the first cluster represents a document, then it can be determined that the page belongs to the document.

In some embodiments, the vector space 500 includes clusters of data points (e.g., data point 503-1 and data point 503-2) representing individual feature vectors corresponding to specific pages (and/or specified features of specific pages). These data points are formed together to form a particular cluster. For example, using the illustration above, the data point 503-1 may represent page 202 of FIG. 2 and data point 503-2 may represent page 204 of FIG. 2, which both belong to the cluster 503 (indicative that the feature values of the data points 503 are within a threshold distance to or similar to other trained data points, or belong to the same document). There are other clusters 505 and the cluster 507 corresponding to other documents or features.

In an illustrative example of how the feature space 500 can be used, embodiments may receive the symbol 202-1 or other inputs (e.g., feature vectors 206A and 204A) in order to predict what the symbol 202-1 is (e.g., a trademark or symbol of Company X). Responsively, some embodiments run the symbol 202-1 through one or more machine learning models in order to weight features, after which a feature vector (e.g., representing the data point 503-1) is embedded in the feature space 500. The feature space 500 in various embodiments represents a multidimensional coordinate system where each feature is associated with one or more dimensions. For example, a first set of values in a vector may represent whether particular words are present in the vector (e.g., "company X"), where a first axis represents the first set of values and a second axis represents a second set of values of the same vector (e.g., the word "page"), which may represent whether another set of words are present. Each feature value within the feature vector may be summed or otherwise aggregated (e.g., via a dot product) to arrive at a final coordinate point (e.g., the data point 503-2) within the feature space 500. In this way, some embodiments map individual page features (or entire pages themselves via LSTM) in the feature space 500 based on its semantic and/or context (e.g., forward and backward context) similarity to each other. Each of the data points within the cluster 503, for example, are within a feature similarity threshold and so they are close to each other (e.g., based on Euclidian distance) in the feature space 500. In some embodiments, in response to a clustering of a given page feature (or all features on a single page), some or each of the data points within the same cluster can be predicted as belonging to the same document (e.g., via the document sequence learning model(s) 210) and/or can be predicted to be a particular feature (e.g., via the document processing model(s) 208). For example, if a feature vector representing a page was mapped as 503-1 inside the cluster 503, then the page can be classified as belonging to a particular document represented by the cluster 503.

The machine learning model(s) are able to cluster samples of new unseen test case identifier and/or test data candidate (e.g., after training). In some embodiments, test data candidate and/or test case identifier is represented by the median of its samples' embeddings as shown below:

$$C_j = \text{median}\{f_{embed}(S_i^j): I=1, 2, \ldots, n\]$$

Where $f_{embed}$ the output of the model, $S_i^j$ is the $i^{th}$ sample of the $j^{th}$ class. The prediction for any test sample X is given by:

$$Pred(X) = \arg\min_j \|C_j - f_{embed}(X)\|.$$

However, it is understood that median is just one way to represent an embedding. Some embodiments alternatively use other statistics like mean, pth percentile, and the like.

FIG. 6A illustrates specific characteristics that can be extracted from a page 600 of an invoice document for document processing (e.g., via the document processing module 104 and/or the document distinguishing module 106), according to some embodiments. In some embodiments, the page 600 represents the page 202 of FIG. 2

The page number 603 A can be extracted, as well as natural language text 605A indicating the entity (i.e., "ABC Plumbing & Heating") responsible for creating the invoice or billing the invoice (e.g., a payer), and the natural language text 607A indicating the entity (i.e., "John Doe") responsible for receiving and paying the bill associated with the invoice (e.g., a payee). Other natural language characters 609A are also extracted, which are indicative of the due date, date, and the like of the invoice. The item line information or "description" 615A is also extracted. Further, the structure or format 613A (i.e., the positioning, thickness, color, and/or the like of the letterhead lines and mark) is extracted, as well as characteristics of the mark 611A itself. Further, the additional natural language note section 617A is also extracted. As described herein (e.g., with respect to FIG. 2), each of these characteristics or values can be represented as an embedded feature vector in vector space to represent the specific page 600 and used in downstream processes for sequence characteristic learning (e.g., via an LSTM), as described herein.

FIG. 6B illustrates a second page 601B, which is a continuation page of the page 600 of FIG. 6A, which illustrates how sequence learning can be performed based on similar characteristics. As described herein (e.g., with respect to the document sequence learning model(s) 210), various embodiments can learn order dependency or forward/backward context based on characteristics of a currently analyzed page in relation to characteristics of prior or later pages. For instance, a sequence learning model can determine relationships or patterns between the pages 600 and 601 (e.g., via an LSTM) in order to determine (e.g., via a classifier) that pages 600 and 601 belong to the same invoice document (e.g., via 212 and 14 classification of FIG. 2).

In an illustrative example, the feature vector embedding representing page 601 may be within a threshold distance (e.g., a predetermined threshold distance) to the feature vector embedding representing page 600. Based on this determination, it can be determined that page 601 is a continuation of the page 600. For instance, feature vector values between pages 600 and 601 may be identical for 605A and 605B and 607A and 607B, since there are no changes from page to page. Likewise, feature vector values between pages 600 and 601 may be identical for 611A, 611B, and 613A, 613B, and 617A, 617B since there are no changes from page to page. However, there are slight changes between page numbers (1 to 2) per 603A and 603B, but since this is encoded via a sequence learning model, such as a LSTM, it can be determined that this follows a logical sequence and refers to a page number (e.g., via object detection or BERT).

Figure 7:
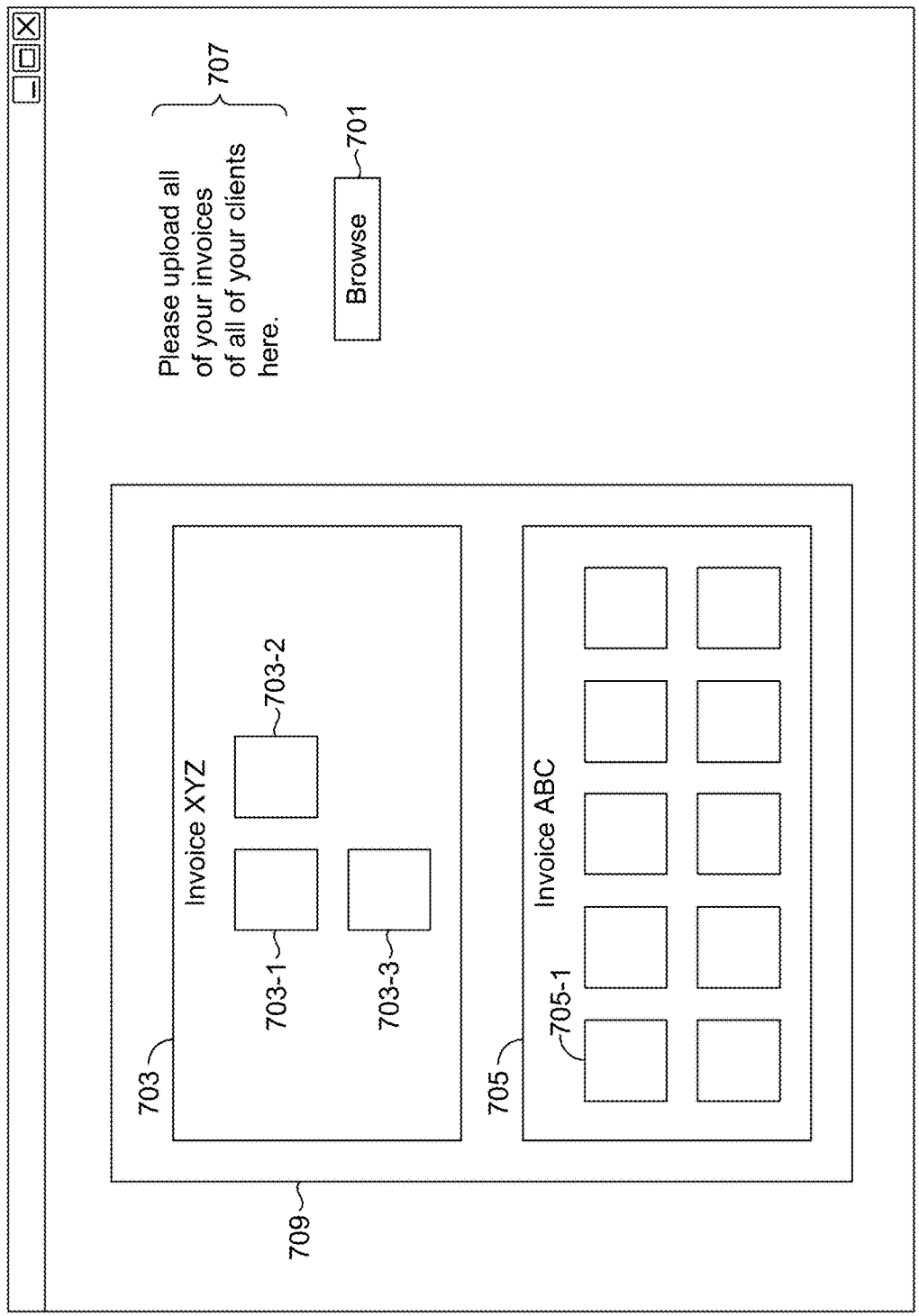
FIG. 7 illustrates a screenshot of an example user interface, according to some embodiments.

FIG. 7 illustrates a screenshot 700 of an example user interface, according to some embodiments. In some embodiments, the screenshot 700 is caused to be presented by the presentation component 108. Likewise, in some embodiments, the screenshot 700 is included in the consumer application 112 of FIG. 1.

At a first time, embodiments can prompt, via 707, a user to upload each invoice document of each client. For instance, certain entities may need to bill or charge various clients that they have via formalized invoices. However, each invoice of various projects and/or various clients may be included in a single file, yet these invoices may need to be parsed out or otherwise separated to send the correct invoice to the correct recipient or payee. For example, in response to receiving an indication that a user has selected the browse button 701, embodiments can communicate with an operating system such that the user can upload a locally stored spreadsheet document of multiple invoices to multiple clients, where each invoice includes multiple pages. Existing technologies require manual user input to parse these documents. But as described herein, embodiments can automatically classify or otherwise determine whether particular pages belong to particular documents.

In response to receiving an indication that the user has uploaded the invoice documents, various embodiments perform functionality described herein (e.g., the document conversion module 102, the document processing module 104, and the document distinguishing module 106 ). For example, embodiments can run each page of a document through the document processing model(s) 208 and the document sequence learning model(s) 210, as described with respect to FIG. 2. Responsive to this functionality, various embodiments cause presentation to the window 709, which indicates specific invoice identifiers and each page that belongs to the corresponding invoice. For example, after determining, via the document sequence learning model(s)

210, that pages 703-1, 703-2, and 703-3 belong to the invoice 703, embodiments can cause presentation of 703, 703-1, 703-2, and 703-3. The window 709 also indicates that invoice 705 has been detected, as well as its corresponding 10 pages.

In some embodiments, responsive or subsequent to the providing of the invoice indicators 703 and 705 (and their corresponding pages), the respective invoices are caused to be transmitted to the respective payee (e.g., via email) and/or uploaded to a payee page (a page that the payee has access to) so that the payee can view the invoices and pay the corresponding bills. For example, the invoice corresponding to the invoice indicator 703 can be transmitted to a first entity, and the invoice corresponding to the invoice indicator 705 can be transmitted to a second entity.

In some embodiments, users can provide feedback in order to tune a machine learning model and/or otherwise change the visual output in the window 709. For example, responsive to the causing of display of the invoices 703 and 705 (and their corresponding pages), the user may see that the page 705-1 of the invoice 705 actually belongs to the invoice 703. For instance, each page may be selectable such that responsive to the selection of a page (e.g., 705-1) within the window 709, a larger view of the page is rendered or caused to be displayed so that the user can see the exact content of the page. After review of the page, the user may notice it belongs to the wrong invoice. Subsequently, various embodiments can receive an indication, for example, that the user has dragged the page 705-1 from a logical field representing the invoice 705 to a logical field representing the invoice 703. Accordingly and responsively, the invoice 705-1 may be represented as belonging to the invoice 703 within the window 709, by being next to, for example, 703-3. Responsively, various embodiments can use this user modification to automatically tune or retrain (e.g., via reinforcement learning) one or more machine learning models, such as the document sequencing learning model(s) 210. Accordingly, at a future prediction, the model is more likely to classify or predict that a page similar to 705-1 belongs to invoice 703, as opposed to invoice 705.

Figure 8:
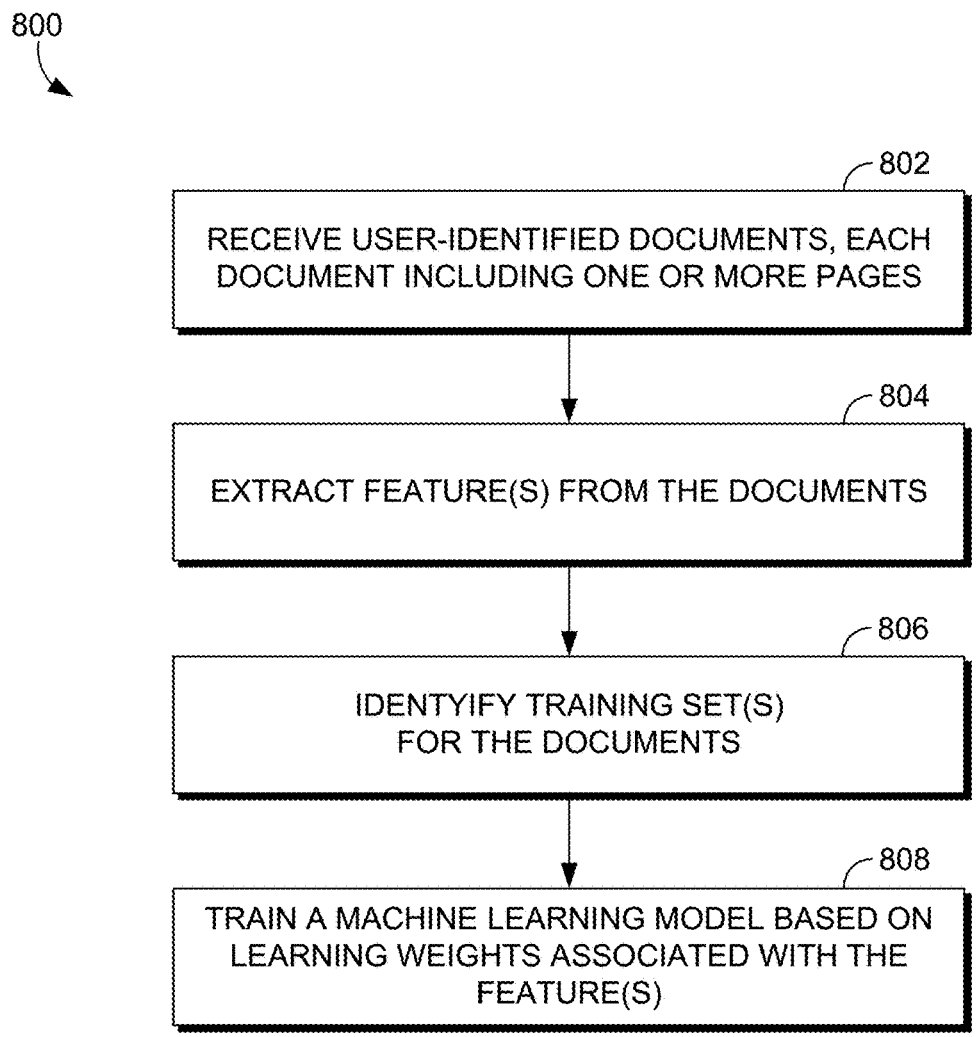
FIG. 8 is a flow diagram of an example process for training a machine learning model using user-identified documents, according to some embodiments.

FIG. 8 is a flow diagram of an example process 800 for training a machine learning model using user-identified documents, according to some embodiments. In some embodiments, the process 800 is performed to train the document processing model(s) 208 and/or the document sequence learning model(s) 210 of FIG. 2. Alternatively or additionally, in some embodiments, the process 800 includes or represents the functionality for training as described with respect to the training data inputs 315 of FIG. 3. In various embodiments, the "user-identified documents" are those documents explicitly or implicitly defined (e.g., by indicating which pages belong to which documents), as described, for example, with respect to the training data inputs 315 of FIG. 3.

The process 800 (and/or any of the functionality described herein) may be performed by processing logic that comprises hardware (e.g., circuitry, dedicated logic, programmable logic, microcode, etc.), software (e.g., instructions run on a processor to perform hardware simulation), firmware, or a combination thereof. Although particular blocks described in this disclosure are referenced in a particular order at a particular quantity, it is understood that any block may occur substantially parallel with or before or after any other block. Further, more (or fewer) blocks may exist than illustrated. Added blocks may include blocks that embody any functionality described herein (e.g., as described with respect to FIG. 1 through FIG. 7). The computer-implemented method, the system (that includes at least one computing device having at least one processor and at least one computer readable storage medium), and/or the computer readable medium as described herein may perform or be caused to perform the process 800 or any other functionality described herein.

Per block 802, a plurality of user-defined documents, each of which include one or more pages, are received. In some embodiments, each document has be identified by customers or other users (e.g., people who do not build machine learning models) prior to training. In this way, building a model does not require extensive labelling by model implementers. For example, some embodiments are naturally supervised and may receive user-defined document with several pages that states "invoice to company X for task A", which indicates that each page of the invoice belongs to the invoice for company X for task A.

Per block 804, particular embodiments extract one or more features from the documents. For example, at a page level, some embodiments extract natural language sentences, photographs, letterhead format, letter styles, text orientation data (e.g., via a bounding box), and the like for each page. At the document or page sequence level, some embodiments (e.g., LSTMs) extract or encode page sequence information, such as repeating page number patterns, repeating format style patterns, sentence fragment continuations, changes in page numbers, changes in format, changes in sentence structure, and the like.

Per block 806, one or more training sets are identified for the documents. For example, in a supervised context where inputs are user-identified, documents from the same business entity are identified in preparation for training. In an illustrative example, pairs of documents that have the same business entity identifier can be paired, as well as pairs of documents that have differing business entity identifiers can be paired.

Per block 808, a machine learning model (e.g., a deep learning model) is trained based at least in part on learning weights associated with the extracted features. For example, it can be learned that the most significant factor for classifying whether a document is a continuation page of an existing document or beginning page of another document is the format structure of the letterhead and/or the page number, whereas other features (e.g., actual sentences, numbers, and the like) change considerable.

In some embodiments, pairs of documents are processed or run through a deep learning model by comparing the associated features and mapping it in feature space. And based at least in part on the processing, weights associated with the deep learning model can be adjusted (e.g., in order to determine what is "remembered" or "forgotten" in an LSTM) to indicate the importance of the extracted featured for prediction or classification. In some embodiments, as described herein, the adjusting includes activating, strengthening, or inactivating a neuron or node in a neural network. In some embodiments, the adjusting includes changing an embedding in feature space of a feature vector representing the pages. For example, after a first round or epochs of training, it may be unknown which of the extracted features are important for taking on a certain classification or prediction. Accordingly, each feature may take on equal weight (or close to equal weight within a threshold, such as a 2% changed weight) such that all of the input feature vectors are substantially close or within a distance threshold in feature space. However, after several rounds of training or any threshold quantity of training, these same feature vectors may adjust or change distances from each other based on the feature value similarity. The more features of two feature vectors that match or are within a threshold value, the closer the two feature vectors are to each other, whereas when features do not match or are not within a threshold value, the further away the two feature vectors are from each other. Accordingly, for example, a trained embedding may look similar to the feature space 500 of FIG. 5.

Figure 9:
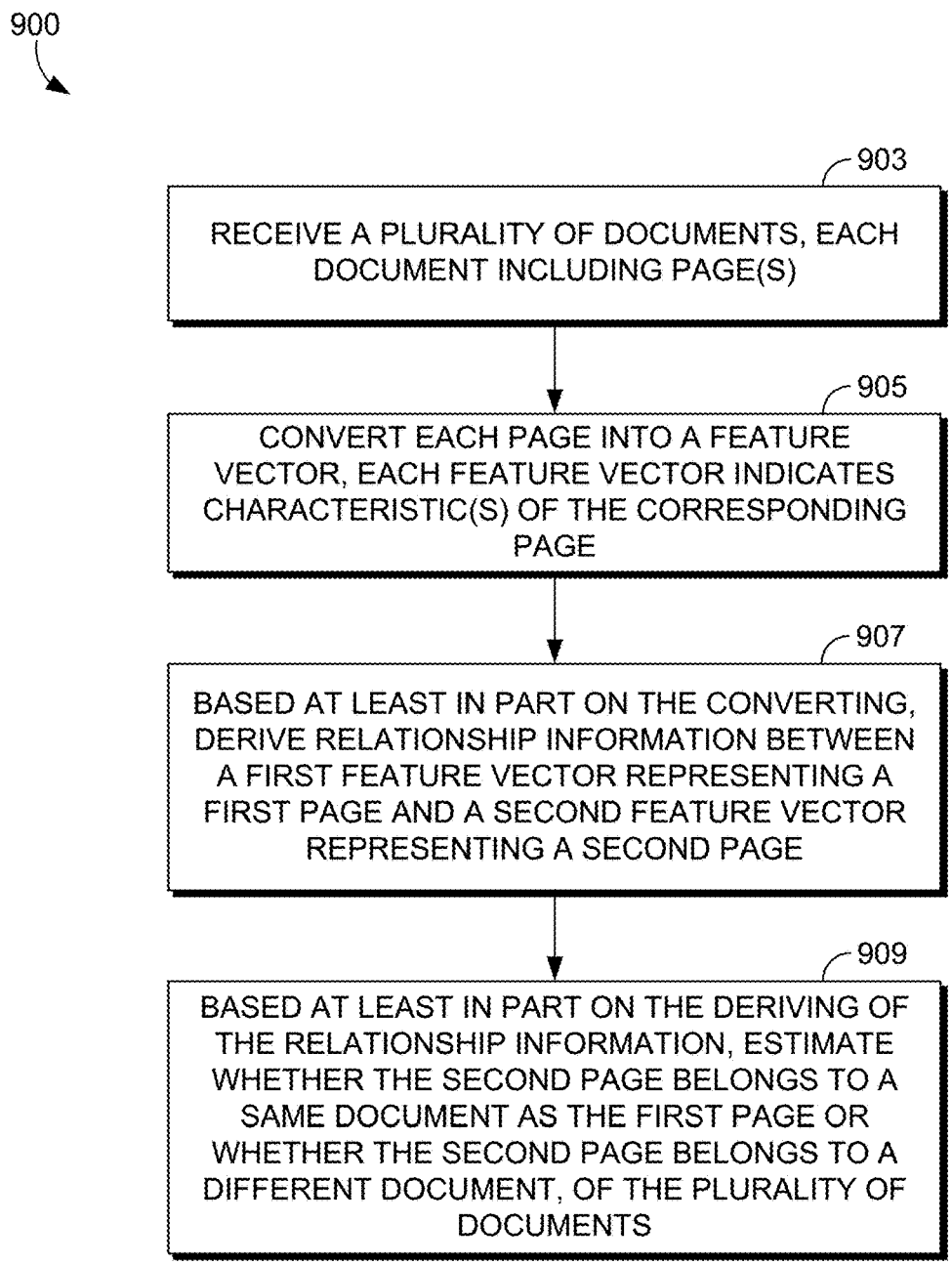
FIG. 9 is a flow diagram of an example process for distinguishing documents by estimating which page belongs to which document, according to some embodiments.

FIG. 9 is a flow diagram of an example process for distinguishing documents by estimating which page belongs to which document, according to some embodiments. In some embodiments, the process 800 representing the training of one or more machine learning models occurs prior to the process 900. Per block 903, a plurality of documents are received, where each document includes one or more pages. For example, the document conversion module 102 can receive a file representing various invoice documents (e.g., FIGS. 6A and 6B) with multiple pages.

In some embodiments, block 903 represents or includes receiving, at a trained first machine learning model, image data of a multi-page document, where the multi-page document includes a first document associated with one or more first pages and a second document associated with one or more second pages. Examples of this are described with respect to the document conversion module 102 and the document processing module 104. For example, a multi-page document may represent a file or other data object aggregation of image data (e.g., Pymu PDF) that has been converted by the document conversion module 102 from another format into the image data. The "trained machine learning model" (e.g., a model having performed the process 800) may be the model used by the document processing module 104 of FIG. 1.

A "trained machine learning model" can reflect any suitable model that has been trained in any fashion as described herein. For example, embodiments can receive, prior to the receiving of the plurality of documents, a second set of documents, where the second set of documents represent user-identified documents (e.g., block 802 of FIG. 2 or 315 of FIG. 3) or actual customer data (e.g., actual customer invoices that are billed to payees). Various embodiments can then extract a set of features from the second set of documents (e.g., via 804 of FIG. 8). Then the model can be trained based on learning weights associated with the set of features (e.g., block 808 of FIG. 8). In this way, characteristics can be detected and feature vectors can be embedded per block 905, as described herein.

Per block 905, various embodiments convert (e.g., via a first machine learning model) each page (of the plurality of documents) into a feature vector, where each feature vector indicates one or more characteristics of the corresponding page (e.g., and no other pages). Examples of block 905 are described with respect to the document processing module 104, the document processing model(s) 208 of FIG. 2, and the model(s) 305 of FIG. 3. In some embodiments, block 905 alternatively includes "deriving" (e.g., receiving) each feature vector or "generating" each feature vector. In some embodiments, block 905 alternatively includes converting one or more pages (e.g., 2 pages, instead of 1 page) of the document into a single feature vector so that multiple pages are represented in a single concatenated feature vector.

In some embodiments, block 905 alternatively or additionally includes generating a first feature vector embedding for the one or more first pages of the multi-page document (described in 903) and a second feature vector embedding for the one or more second pages of the multi-page document, where the first and second vector embedding embedded based on learned patterns for document characteristics. Examples of these feature vector embeddings that are generated based on learned patterns are described with respect to the feature space 500 of FIG. 5, the feature vectors 206A, 204A, and 202A of FIG. 2, the document processing module 104 of FIG. 1, and the model(s) 305 of FIG. 3.

In some embodiments, the first machine learning model is a computer-vision-based machine learning model, such as a deep neural network (DNN), such as a Convolutional Neural Network (CNN), object detection based model, or any other model described with respect to the document processing module 104 of FIG. 1.

Per block 907, based at least in part on the converting, some embodiments derive relationship information between a first feature vector representing a first page and a second feature vector representing a second page. Examples of this are described herein with respect to the document sequence learning model(s) 210 that learn, for example, patterns or relationships between the feature vectors 202A, 204A and 206A, as described with respect to FIG. 2. Other examples includes the functionality described with respect to the LSTM of FIG. 4. In an illustrative example, it can be learned that a page number feature and orientation of a document is highly indicative of whether the page belongs to a particular document. Accordingly, this information can be passed from cell to cell (e.g., via the LSTM 400 of FIG. 4) (e.g., via activation weighting of a neural node connection). Alternatively, it can be learned that the actual natural language content (e.g., billing, item line information, etc.) is not indicative of whether a page belongs to a certain document (which may be highly variable). Accordingly, this information can be forgotten via a forget gate (e.g., via the LSTM 400 of FIG. 4) (e.g., via inhibition weighting of a neural network node). In some embodiments, such "learning" as described herein refers to the training via the process 800 and/or the training data inputs 315 of FIG. 3. In other words, the deriving of the relationship information can be based on deriving relationships or patterns from an already-trained machine learning model.

In some embodiments, the deriving at block 909 occurs via a second machine learning model (e.g., as described with respect to the LSTM 400 of FIG. 4, the document sequence learning model(s) 210 of FIG. 2, and/or a Bi-Directional LSTM). In some embodiments, the first page and the second page are sequentially ordered, as described, for example with respect to the pages 202, 204, and 206 of FIG. 2, and the pages 600 and 601 of FIGS. 6A and 6B respectively.

In some embodiments, block 907 alternatively or additionally includes feeding the first feature vector embedding and the second feature embedding to a second machine learning model to determine a transition from the one or more first pages and the one or more second pages within the multi-page document. This is described, for example, with respect to 212 and 214 of FIG. 2 and the LSTM 400 of FIG. 4. For example, to "determine a transition," various embodiments generate a 1 classification (where a previous page has been classified as 0), where 1 indicates the starting page of a new document (e.g., 214), and where 0 indicates a continuation page of a previous page of a document (e.g., via 212).

Per block 909, based at least in part on the deriving of the relationship information, particular embodiments estimate whether the second page belongs to a same document as the first page or whether the second page belongs to a different document, of the plurality of documents. Examples of this are described with respect to 212 and 214 of FIG. 4, the document distinguishing module 106 of FIG. 1, and the decision statistic 307 of FIG. 3. In some embodiments, block 909 alternatively or additionally includes distinguishing the first document from the second document based on the feeding to determine a transition described above with respect to block 907.

In some embodiments, the "estimating" or "distinguishing" is associated with (e.g., it includes or is preceded by) determining, using a binary classification, whether the second page is a continuation of the first page of the first document or whether the second page is a starting page of the second document. Examples of this are described with respect to 212 and 214 of FIG. 2.

In some embodiments, the "estimating" or "distinguishing" is based at least in part on concatenating information from one or more previously ordered pages and/or one or more later ordered pages to predict whether a currently analyzed page belongs to a first document or a second document. Examples of this are described with respect to FIG. 2, where the "currently analyzed" page may correspond to the feature vector 204 A (or page 204) and the previously ordered page may correspond to feature vector 202 A (or page 202) and the later ordered page may correspond to feature vector 206 A (or page 206).

Various embodiments determine that the second page belongs to a same document as the first page and based on this determination, generate a user interface element. For example, referring back to FIG. 7, various embodiments can cause presentation of the page 703-2 (the second page) next to the page 703-1 (the first page), as illustrated in FIG. 7. Alternatively, some embodiments determine that the second page belongs to a different document relative to the first document. And based at least in part on this determination, various embodiments generate a user interface element. Continuing with FIG. 7, some embodiments determine that the page 705-1 (the second page), belongs to the invoice 705, instead of the invoice 703. Accordingly, embodiments cause presentation of the page 705-1 as it is illustrated in FIG. 7. In some embodiments, the "estimating" includes using a classifier model (e.g., subsequent to encoding sequential pattern information from an LSTM). For example, the classifications 212 and 214 can be generated using a separate classifier model of the document sequence learning model(s) 210 of FIG. 2.

Figure 10:
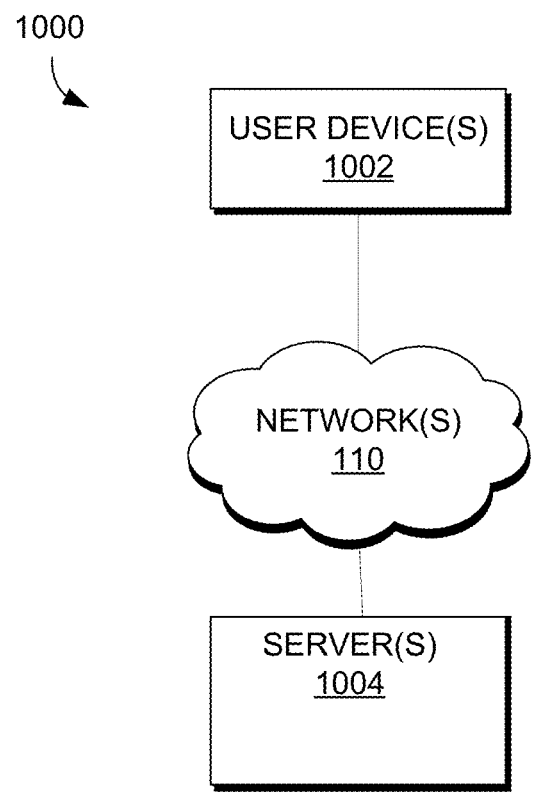
FIG. 10 is a block diagram of a computing environment in which aspects of the present technology are implemented within, according to some embodiments.

FIG. 10 is a block diagram of a computing environment 1000 in which aspects of the present disclosure are employed in, according to certain embodiments. Although the environment 1000 illustrates specific components at a specific quantity, it is recognized that more or less components may be included in the computing environment 1000. For example, in some embodiments, there are multiple user devices 1002 and multiple servers 1004, such as nodes in a cloud or distributing computing environment. In some embodiments, some or each of the components of the system 100 of FIG. 1 are hosted in the one or more servers 1004. In some embodiments, the user device(s) 1002 and/or the server(s) 1004 may be embodied in any physical hardware, such as the computing device 1100 of FIG. 11. The server(s) 1004 include the test-case test data candidate mapping component 1004-1. In some embodiments, the test-case test data candidate mapping component 1004-1 represents or includes identical functionality as the test case—test data candidate mapping component 109 of FIG. 1.

The one or more user devices 1002 are communicatively coupled to the server(s) 1004 via the one or more networks 110. In practice, the connection may be any viable data transport network, such as, for example, a LAN or WAN. Network(s) 110 can be for example, a local area network (LAN), a wide area network (WAN) such as the Internet, or a combination of the two, and include wired, wireless, or fiber optic connections. In general, network(s) 110 can be any combination of connections and protocols that will support communications between the control server(s) 1004 and the user devices 1002.

In some embodiments, a user issues a query on the one or more user devices 1002, after which the user device(s) 1002 communicate, via the network(s) 110, to the one or more servers 1004 and the one or more servers 1004 executes the query (e.g., via one or more components of FIG. 1) and causes or provides for display information back to the user device(s) 1002. For example, the user may issue a query at the user device 1002 that is indicative of an upload request via the rows button 701. Responsively, the server(s) 1004 can perform functionality necessary to generate the invoice identifier 703, 705, and their corresponding page information.

The invention may be described in the general context of computer code or machine-useable instructions, including computer-executable instructions such as program modules, being executed by a computer (or one or more processors) or other machine, such as a personal data assistant or other handheld device. Generally, program modules including routines, programs, objects, components, data structures, etc., refer to code that perform particular tasks or implement particular abstract data types. The invention may be practiced in a variety of system configurations, including handheld devices, consumer electronics, general-purpose computers, more specialty computing devices, etc. The invention may also be practiced in distributed computing environments where tasks are performed by remote-processing devices that are linked through a communications network.

Figure 11:
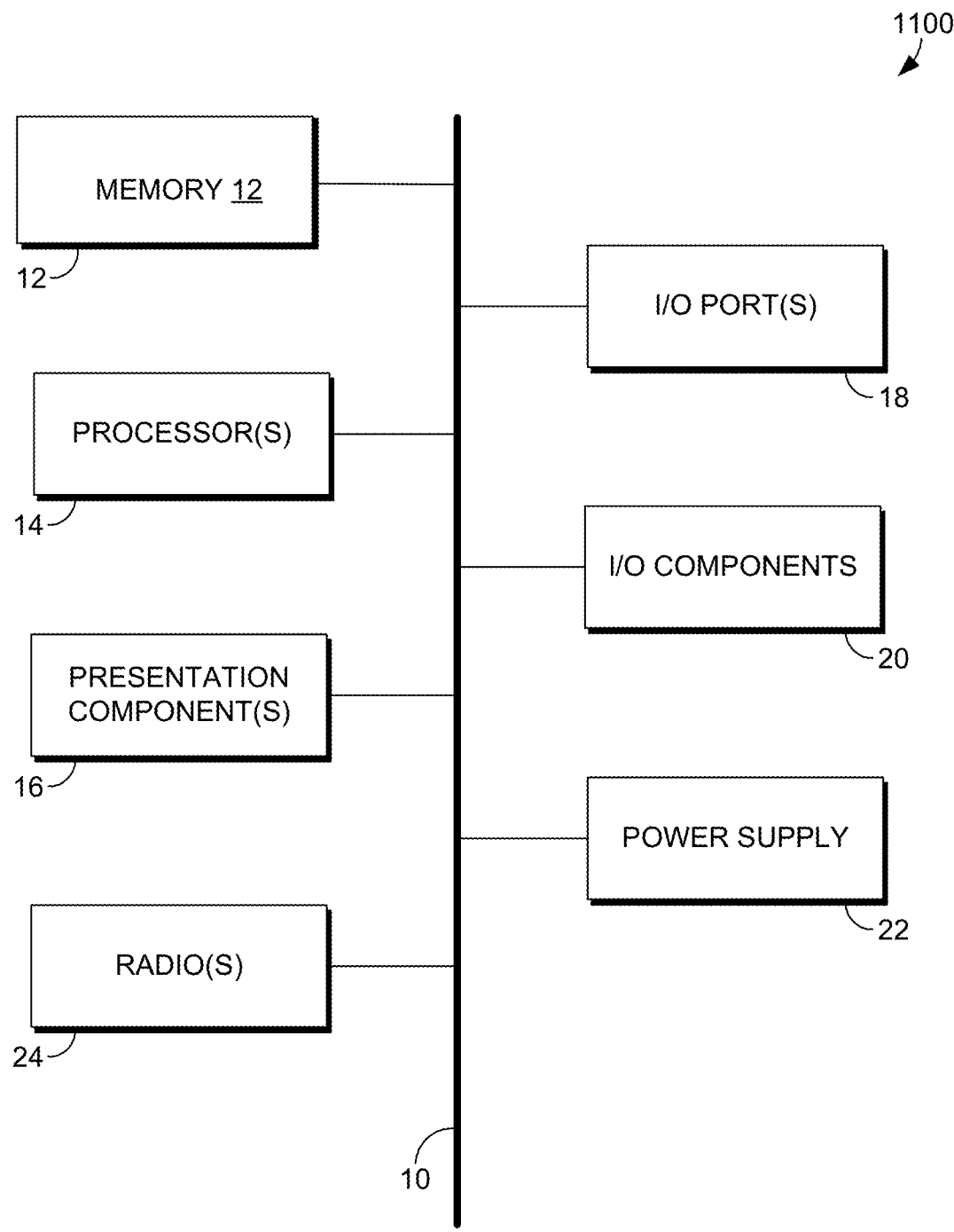
FIG. 11 is a block diagram of a computing device in which aspects of the present disclosure are implemented within, according to some embodiments.

With reference to FIG. 11, computing device 1100 includes bus 10 that directly or indirectly couples the following devices: memory 12, one or more processors 14, one or more presentation components 16, input/output (I/O) ports 18, input/output components 20, and illustrative power supply 22. Bus 10 represents what may be one or more busses (such as an address bus, data bus, or combination thereof). Although the various blocks of FIG. 11 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors recognize that such is the nature of the art, and reiterate that this diagram is merely illustrative of an exemplary computing device that can be used in connection with one or more embodiments of the present invention. Distinction is not made between such categories as "workstation," "server," "laptop," "hand-held device," etc., as all are contemplated within the scope of FIG. 11 and reference to "computing device."

In some embodiments, the computing device 1100 represents the physical embodiments of one or more systems and/or components described above. For example, the computing device 1100 can represent: the one or more user devices 1002, and/or the server(s) 1004 of FIG. 10. The computing device 1100 can also perform some or each of the blocks in the process 800, 900 and/or any functionality described herein with respect to FIGS. 1-10. It is understood that the computing device 1100 is not to be construed necessarily as a generic computer that performs generic functions. Rather, the computing device 1100 in some embodiments is a particular machine or special-purpose computer. For example, in some embodiments, the computing device 1100 is or includes: a multi-user mainframe computer system, one or more cloud computing nodes, a single-user system, or a server computer or similar device that has little or no direct user interface, but receives requests from other computer systems (clients), a desktop computer, portable computer, laptop or notebook computer, tablet computer, pocket computer, telephone, smart phone, smart watch, or any other suitable type of electronic device.

Computing device 1100 typically includes a variety of computer-readable media. Computer-readable media can be any available media that can be accessed by computing device 1100 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 1100. Computer storage media does not comprise signals per se. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 12 includes computer storage media in the form of volatile and/or nonvolatile memory. The memory may be removable, non-removable, or a combination thereof. Exemplary hardware devices include solid-state memory, hard drives, optical-disc drives, etc. Computing device 1100 includes one or more processors 14 that read data from various entities such as memory 12 or I/O components 20. Presentation component(s) 16 present data indications to a user or other device. Exemplary presentation components include a display device, speaker, printing component, vibrating component, etc.

I/O ports 18 allow computing device 800 to be logically coupled to other devices including I/O components 20, some of which may be built in. Illustrative components include a microphone, joystick, game pad, satellite dish, scanner, printer, wireless device, etc. The I/O components 20 may provide a natural user interface (NUI) that processes air gestures, voice, or other physiological inputs generated by a user. In some instance, inputs may be transmitted to an appropriate network element for further processing. A NUI may implement any combination of speech recognition, touch and stylus recognition, facial recognition, biometric recognition, gesture recognition both on screen and adjacent to the screen, air gestures, head and eye-tracking, and touch recognition associated with displays on the computing device 1100. The computing device 1100 may be equipped with depth cameras, such as, stereoscopic camera systems, infrared camera systems, RGB camera systems, and combinations of these for gesture detection and recognition. Additionally, the computing device 1100 may be equipped with accelerometers or gyroscopes that enable detection of motion.

As described above, implementations of the present disclosure relate to automatically generating a user interface or rendering one or more applications based on contextual data received about a particular user. The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and sub combinations are of utility and may be employed without reference to other features and sub combinations. This is contemplated by and is within the scope of the claims.

Definitions

"And/or" is the inclusive disjunction, also known as the logical disjunction and commonly known as the "inclusive or." For example, the phrase "A, B, and/or C," means that at least one of A or B or C is true; and "A, B, and/or C" is only false if each of A and B and C is false.

A "set of" items means there exists one or more items; there must exist at least one item, but there can also be two, three, or more items. A "subset of" items means there exists one or more items within a grouping of items that contain a common characteristic.

A "plurality of" items means there exists more than one item; there must exist at least two items, but there can also be three, four, or more items.

"Includes" and any variants (e.g., including, include, etc.) means, unless explicitly noted otherwise, "includes, but is not necessarily limited to."

A "user" or a "subscriber" includes, but is not necessarily limited to: (i) a single individual human; (ii) an artificial intelligence entity with sufficient intelligence to act in the place of a single individual human or more than one human; (iii) a business entity for which actions are being taken by a single individual human or more than one human; and/or (iv) a combination of any one or more related "users" or "subscribers" acting as a single "user" or "subscriber."

The terms "receive," "provide," "send," "input," "output," and "report" should not be taken to indicate or imply, unless otherwise explicitly specified: (i) any particular degree of directness with respect to the relationship between an object and a subject; and/or (ii) a presence or absence of a set of intermediate components, intermediate actions, and/or things interposed between an object and a subject.

A "module" or "component" is any set of hardware, firmware, and/or software that operatively works to do a function, without regard to whether the module is: (i) in a single local proximity; (ii) distributed over a wide area; (iii) in a single proximity within a larger piece of software code; (iv) located within a single piece of software code; (v) located in a single storage device, memory, or medium; (vi) mechanically connected; (vii) electrically connected; and/or (viii) connected in data communication. A "sub-module" is a "module" within a "module."

The terms first (e.g., first cache), second (e.g., second cache), etc. are not to be construed as denoting or implying order or time sequences unless expressly indicated otherwise. Rather, they are to be construed as distinguishing two or more elements. In some embodiments, the two or more elements, although distinguishable, have the same makeup. For example, a first memory and a second memory may indeed be two separate memories but they both may be RAM devices that have the same storage capacity (e.g., 4 GB).

The term "causing" or "cause" means that one or more systems (e.g., computing devices) and/or components (e.g., processors) may in in isolation or in combination with other systems and/or components bring about or help bring about a particular result or effect. For example, a server computing device may "cause" a message to be displayed to a user device (e.g., via transmitting a message to the user device) and/or the same user device may "cause" the same message to be displayed (e.g., via a processor that executes instructions and data in a display memory of the user device). Accordingly, one or both systems may in isolation or together "cause" the effect of displaying a message.

What is claimed is:

1. A computerized system comprising:
   one or more processors; and
   a non-transitory computer storage memory having computer-executable instructions stored thereon which, when executed by the one or more processors, implement a method comprising:
   receiving, at a trained first machine learning model, image data of a multi-page document, the multi-page document including a first document that includes one or more first pages of the multi-page document and a second document that includes one or more second pages of the multi-page document;
   in response to the receiving, at the trained first machine learning model, of the image data, generating a first feature vector embedding for the one or more first pages of the multi-page document and a second feature vector embedding for the one or more second pages of the multi-page document, the first and second vector embedding embedded based on learned patterns for document characteristics; and
   based on feeding the first feature vector embedding and the second feature vector embedding to a second machine learning model determine whether each page, of the one or more first pages and the one or more second pages, is a continuation page of a previous page of a document or whether each page is a starting page of a new document; and
   based on the determining, distinguishing the first document from the second document.

2. The system of claim 1, wherein the first machine learning model is a computer-vision-based machine learning model.

3. The system of claim 1, wherein the second machine learning model is one of: a Long-Short-Term-Memory (LSTM) model or a Bi-Directional LSTM.

4. The system of claim 1, wherein the first document is a first invoice and the second document is a second invoice.

5. The system of claim 1, wherein the method further comprises:
   receiving, prior to the receiving of the image data, a second set of documents, the second set of documents representing user-identified documents;
   extracting a set of features from the second set of documents;
   training the second machine learning model based on learning weights associated with the set of features, wherein the determining is based at least in part on the training.

6. The system of claim 1, wherein the determining is based on using a binary classification.

7. The system of claim 1, wherein the determining is based at least in part on concatenating information from one or more previous pages to predict whether a currently analyzed page belongs to the first document or the second document.

8. A computer-implemented method comprising:
   receiving a plurality of documents, each document including one or more pages;
   converting, via a first machine learning model, each page of the plurality of documents into a feature vector, the feature vector indicates one or more characteristics of the corresponding page;
   based at least in part on the converting, deriving via a second machine learning model, relationship information between a first feature vector representing a first page and a second feature vector representing a second page, the first page being sequentially ordered first relative to the second page;
   based at least in part on the deriving of the relationship information, determining that one of: the second page is a continuation of the first page of a first document or the second page is a starting page of a second document; and
   based on the determining that one of: the second page is the continuation of the first page of the first document or the second page is a starting page of the second document, determining whether the second page belongs to a same document as the first page or whether the second page belongs to a different document, of the plurality of documents.

9. The method of claim 8, wherein the first machine learning model is a computer-vision-based machine learning model.

10. The method of claim 8, wherein the second machine learning model is one of: a Long-Short-Term-Memory (LSTM) model or a Bi-Directional LSTM.

11. The method of claim 8, wherein the plurality of documents are invoice documents.

12. The method of claim 8, further comprising:
    receiving, prior to the receiving of the plurality of documents, a second set of documents, the second set of documents representing actual customer data;
    extracting a set of features from the second set of documents;
    training the second machine learning model based on learning weights associated with the set of features, wherein the determining whether the second page belongs to a same document as the first page or whether the second page belongs to a different document, of the plurality of documents is based at least in part on the training.

13. The method of claim 8, wherein the determining that one of: the second page is a continuation of the first page of a first document or the second page is a starting page of a second document is based on using a binary classification.

14. The method of claim 8, wherein the determining whether the second page belongs to a same document as the first page or whether the second page belongs to a different document, of the plurality of documents is based at least in part on concatenating information from one or more previously ordered pages and one or more later ordered pages to predict whether a currently analyzed page belongs to a first document or a second document.

15. The method of claim 8, further comprising:
determining that the second page belongs to a same document as the first page; and
based at least in part on the determining, generating a user interface element.

16. The method of claim 8, further comprising:
determining that the second page belongs to a different document relative to the a first document; and
based at least in part on the determining, generating a user interface element.

17. One or more non-transitory computer storage media having computer-executable instructions embodied thereon that, when executed, by one or more processors, cause the one or more processors to perform a method, the method comprising:
receiving a plurality of documents, each document including one or more pages;
converting, via a first machine learning model, one or more pages of the plurality of documents into a feature vector, the feature vector indicates one or more characteristics of the one or more pages;
based at least in part on the converting, deriving relationship information between a first feature vector representing a first page and a second feature vector representing a second page;
based at least in part on the deriving, determining that one of: the second page immediately follows the first page of a first document or the second page is a starting page of a second document; and
based at least in part on the determining that one of: the second page immediately follows the first page of the first document or the second page is a starting page of the second document, estimating whether the second page belong to a same document as the first page or whether the second page belongs to a different document, of the plurality of documents.

18. The one or more non-transitory computer storage media of claim 17, wherein the first machine learning model is a deep neural network, and wherein the estimating includes using a classifier model, and wherein the deriving includes using one of: a Long-Short-Term-Memory (LSTM) model or a Bi-Directional LSTM.

19. The one or more non-transitory computer storage media of claim 17, wherein the plurality of documents are invoice documents.

20. The one or more non-transitory computer storage media of claim 17, wherein the estimating includes determining, using a binary classification, whether the second one or more pages is a continuation of the first one or more pages of a first document or whether the second one or more pages is a starting page of a second document.

* * * * *